United States Patent
Doshita et al.

(10) Patent No.: US 6,603,076 B2
(45) Date of Patent: Aug. 5, 2003

(54) POWER SUPPLY STRUCTURE IN SLIDING STRUCTURE

(75) Inventors: Kenichi Doshita, Shizuoka (JP); Tohru Aoki, Shizuoka (JP); Mitsunori Tsunoda, Shizuoka (JP); Mitsunobu Kato, Shizuoka (JP); Hiroshi Watanabe, Shizuoka (JP); Ryoichi Fukumoto, Aichi (JP)

(73) Assignees: Yazaki Corporation, Tokyo (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/829,396

(22) Filed: Apr. 10, 2001

(65) Prior Publication Data

US 2001/0052203 A1 Dec. 20, 2001

(30) Foreign Application Priority Data

Apr. 11, 2000 (JP) ........................................ 2000-109637
Mar. 16, 2001 (JP) ........................................ 2001-076513

(51) Int. Cl.⁷ ................................................. H02G 3/00
(52) U.S. Cl. ..................... 174/72 A; 174/135; 174/136; 174/72 C; 174/70 R; 174/70; 174/69
(58) Field of Search ............................... 174/72 A, 135, 174/136, 72 C, 70 R, 70 C, 69; 191/22 R, 23 R; 296/152, 146.12; 49/26–28

(56) References Cited

U.S. PATENT DOCUMENTS 6,076,883 A * 6/2000 Labonde et al. ............ 296/155
6,079,767 A * 6/2000 Faubert et al. .............. 296/155
6,176,715 B1 * 1/2001 Buescher ..................... 439/162
6,321,489 B1 * 11/2001 Murofushi et al. ........... 49/360
6,340,199 B1 * 1/2002 Fukumoto et al. .......... 296/155

* cited by examiner

Primary Examiner—Dean A. Reichard
Assistant Examiner—Jinhee J Lee
(74) Attorney, Agent, or Firm—Armstrong, Westerman & Hattori, LLP

(57) ABSTRACT

In a power supply structure in a sliding structure, the one end of a wire harness 3 is secured to either one of a sliding structure 1 and a body 5. The other end of the wire harness 3 is hung over the other of them. An elastic member 4 is arranged along the wire harness in the longitudinal direction from the one end of the wire harness so that the wire harness is supported by the elastic member. The elastic member 4 may be a lengthy flat spring. The elastic member may be composed of a first spring segment along the outer face of the wire harness and a second spring segment having a small spring constant which protrudes toward a free end of the elastic member. The elastic member may be bent at an intermediate position in the longitudinal direction and arranged on the curved portion of the wire harness. The elastic member may be composed of a flat spring segment along the inner face of the curved portion and a spiral segment. The elastic member may be provided with a harness supporting member. The elastic member may be secured to a protector using a fixing jig. In such a configuration, the looseness of the wire harness when the sliding structure is opened or closed can be surely absorbed in a simple and small structure.

23 Claims, 14 Drawing Sheets

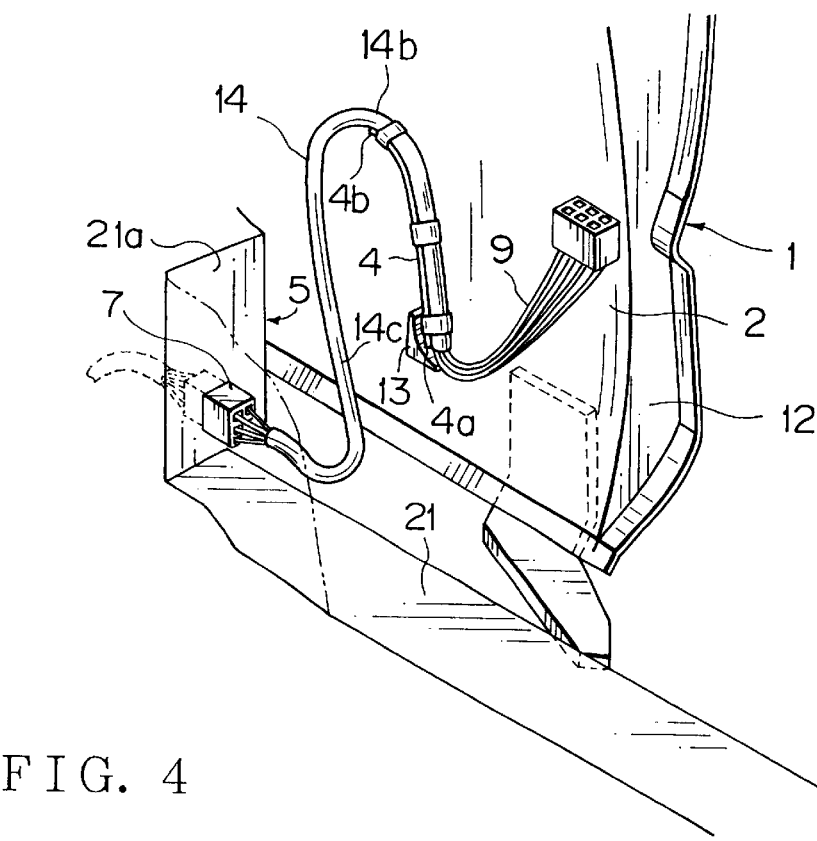
FIG. 4
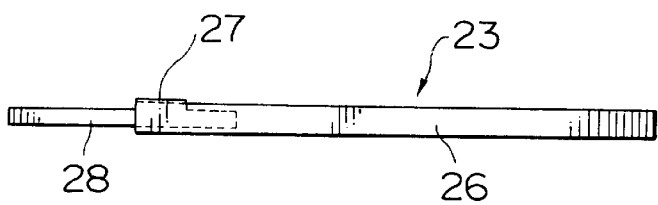
FIG. 10A
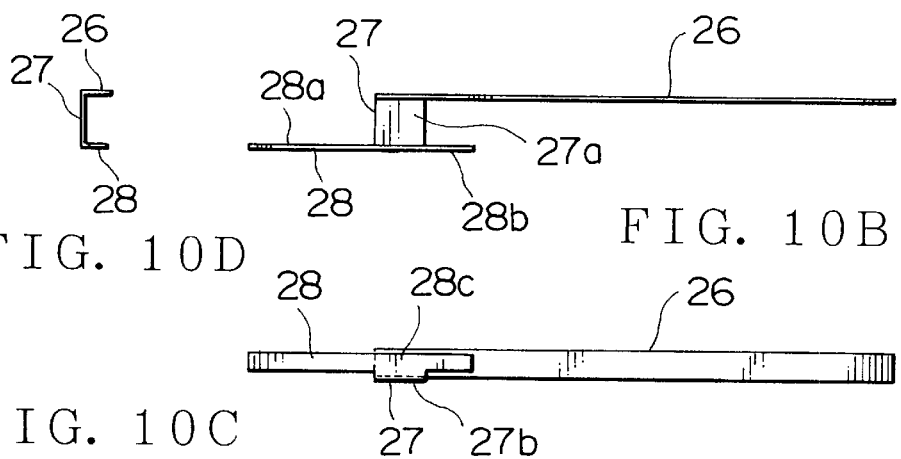
FIG. 10D
FIG. 10B
FIG. 10C

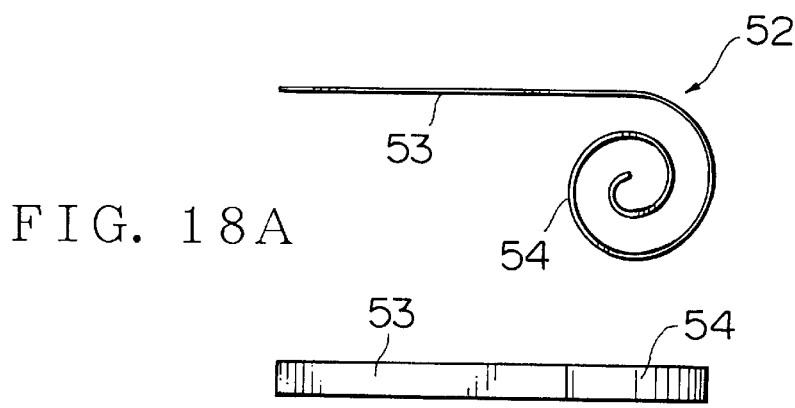
FIG. 18A
FIG. 18B
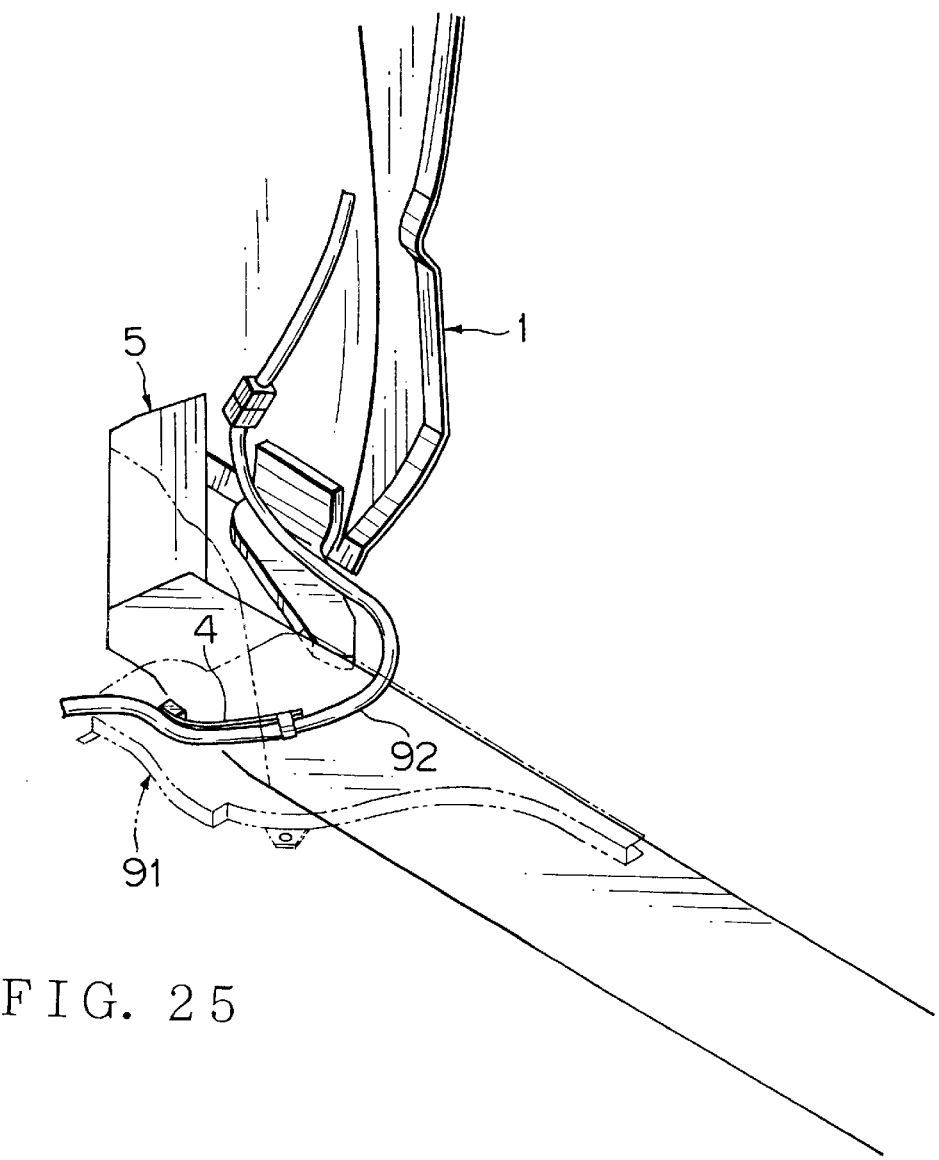
FIG. 25

POWER SUPPLY STRUCTURE IN SLIDING STRUCTURE

BACKGROUND OF THE INVENTION

1. Field of the Invention

This invention relates to a power supply structure in a sliding structure which is applied to a slide door of a motor vehicle, and can absorb the looseness of a wire harness with opening/closing of the slide door in order to supply power from e.g. a vehicle body (power source) to the slide door all the time.

2. Description of the Related Art

The slide door of e.g. one-box car is provided with functional components such as various electric appliances (e.g. a power window motor, a switch unit for operating a motor and a window scissoring preventing sensor) and an auxiliary component.

In order to supply these functional components with a power and signal current, a wire harness is wired from a vehicle body (battery side) to a slide door, and connected to each of the functional components within the slide door. Power supply to the respective functional components must be done regardless with the opening/closing state of the slide door.

However, in order to make charging all the time, the wire harness on the side of the slide door must be caused to expand or contract to absorb the opening/closing stroke with the opening/closing operation of the slide door or sliding structure (looseness absorbing mechanism). To this end, various components such as a guide rail, slider and an arm member are required. This gave rise to various problems of an increase in the number of components, complication, high cost and upsizing of the structure and an increase in the weight of the slide door.

Where such a looseness absorbing mechanism is not provided, when the slide door is opened or closed, the wire harness sags or looses so that it is caught into between the slide door and a vehicle body. In addition, it may vibrate owing to vibration while a vehicle runs so that it is damaged owing to its interference with other components.

Even where the looseness absorbing mechanism is used, if the slide door is opened or closed in a greater degree than a prescribed opening/closing stroke, excessive tension may be applied to the wire harness, and hence undue stress may be applied to the respective wires of the wire harness. Where the wire harness with relatively long wires has been manufactured, the wire harness (electric wires) may be caught into between the slide door and the vehicle body when the slide door is opened or closed. On the other hand, where the wire harness with relatively short wires has been manufactured, excessive tension may be applied to the wires when the side door is opened or closed, and hence undue stress may be applied likewise.

SUMMARY OF THE INVENTION

An object of this invention is to provide a power supply structure in a sliding structure with a simple, inexpensive and small structure which can surely absorb the looseness of a wire harness when the slide structure is opened or closed and prevent an excessive tension from being applied to the wire harness, the wire harness from being caught into between itself and a vehicle body and the wire harness from interfering with other components owing to vibration.

In order to attain the above object, in accordance with this invention, there is provided a power supply structure in a sliding structure comprising:

a wire harness a first end of which is secured to one of a sliding structure and a body and a second end of which is connected to the other of the sliding structure and the body, the wire harness being arranged between the sliding structure and the body; and an elastic member arranged along the wire harness in a longitudinal direction of the wire harness from the first end of the wire harness so that wire harness is supported by the elastic member.

In this configuration, even if the wire harness is pulled when the sliding structure is closed, the wire harness is supported in the curved state by the elastic member. In this case, the curved portion of the wire harness is extended against urging by the elastic member so that the pulling force is absorbed, and not tightened. Thus, the wire harness does not suffer from undue stress, which prevents the wire harness from being damaged. Since the wire harness is urged always in a pulling direction by the elastic member, it does not have looseness. Therefore, it does occur that the wire harness is damaged owing to interference with other components owing to e.g. vibration.

The pulling force of the wire harness is relaxed as the sliding structure is opened. However, simultaneously, the elastic member urges the wire harness in the pulling direction so that the looseness of the wire harness is absorbed. This prevents the wire harness from being caught in between the sliding structure and the body. Further, since the looseness of the wire harness can be absorbed by a simple structure using only the elastic member, the component cost and assembling cost is low and an increase in the weight of the sliding structure can be suppressed.

Preferably, the elastic member is secured to the wire harness. In this configuration, since the wire harness and the elastic member are integrated, the wire harness neither deviates from the elastic member nor floats therefrom. When the wire harness is pulled and contracted, the elastic member surely follows the wire harness to urge the wire harness in a direction of suppressing the looseness. Thus, the looseness of the wire harness can surely be absorbed. Previous assembling of the wire harness with the wire harness can facilitate the assembling of the wire harness with a motor vehicle.

Preferably, the elastic member is a lengthy flat spring. In this case, since the elastic member is simple in shape, the material cost and production cost of the elastic member are low. The lengthy flat spring can be easily secured along and to the wire harness. Further, since the lengthy elastic member is in contact with the wire harness in face or linear contact over the entire length, the urging force is uniformly acted on the wire harness. Therefore, the bending operation of the wire harness when it is pulled and the operation of absorbing the looseness when it is contacted can be done smoothly and surely. This prevents the wire harness from suffering from undue stress.

Preferably, a stem of the elastic member is located at a fixed side of the wire harness whereas a tip of the elastic member is located at a top of a curved segment of the wire harness. In such a configuration of the elastic member, since the one end of the elastic member is located on the fixed side of the wire harness, the elastic member makes smooth bending at a fulcrum of the fixed side of the wire harness. This permits the looseness of the wire harness from being surely absorbed. Further, the other end of the elastic member is located at the top of the curved portion of the wire harness, the clear arc shape of the curved portion of the wire harness is assured when the sliding structure is opened/closed. This prevents the wire harness from being bent unduly, and prevents the wire harness from suffering from undue stress.

Preferably, the elastic member is arranged along a curved inner face of the wire harness. In this case, since the elastic member is located not along the curved outer face but along the curved inner face, the stretch of the elastic member when the curved portion of the wire harness is warped is prevented so that the curved portion can be smoothly warped in directions of reducing or increasing the diameter of the curve. Thus, the looseness of the wire harness can be absorbed smoothly and surely.

In a preferred embodiment, the elastic member includes a first spring segment along a curved outer face of the wire harness and a second spring segment along a curved inner face of the wire harness, the second spring segment protrudes toward a free end of the elastic member and the spring segment has a spring constant larger than that of the first spring segment.

In this configuration, the curved portion of the wire harness is drawn up by the outer first spring segment and is pushed up by the inner second spring segment. Thus, the looseness of the wire harness when the sliding structure is opened/closed can be surely absorbed. Particularly, since the second spring segment on the tip side has a small spring constant, the curved portion of the wire harness can be greatly reduced in diameter against the spring force by small force. This suppresses the force required to open or close the sliding structure, thereby improving the operability of opening/closing. Further, since the curved portion of the wire harness can be reduced in diameter when the sliding structure is fully opened, the curved portion of the wire harness when the sliding structure is fully opened can be set at a small diameter. This contributes to decrease the size of the power supply structure. For example, the protector for accommodating the sliding structure can be downsized. This enhances freedom of arrangement or design of components in the sliding structure to which the protector is attached.

Preferably, the first spring segment and the second spring segment are coupled by a coupling segment. In such a configuration, the elastic member can be easily formed at low cost. Further, since the coupling segment can be used to position the wire harness in a radial direction, the assembling of the wire harness with the elastic member can be facilitated.

Preferably, a tip segment and a stem segment of the second spring segment protrude from the coupling segment in opposite directions, and the stem segment of the second spring segment is opposed to the first spring segment. In this configuration, the tip side of the second spring segment and the stem side thereof are individually located before and after the coupling segment, the wire harness can be held stably. Since the stem side of the second spring segment is opposed to the first spring segment, the urging force can be increased, thereby permitting the looseness to be surely absorbed.

Preferably, the first spring segment, the second spring segment and the coupling segment are formed in a sheet form, and the second spring segment is shorter and narrower than the first spring segment. In such a configuration, the power supply structure can be made compact. Since the wire harness is supported additionally at the free end of the elastic member in such a configuration, the curved portion of the wire harness can be greatly reduced in diameter by small force. This contributes to downsize the power supply structure.

Preferably, the wire harness is fixedly sandwiched between the first spring segment and the spring segment at the coupling segment. This configuration facilitates the operation of securing the elastic member to the wire harness, improves the operability of assembling and reducing the production cost since another securing member is not required.

In a preferred embodiment, the elastic member is bent at an intermediate position in a longitudinal direction to form a bending segment and arranged a curved outer face of the wire harness, a tip of the elastic member is secured to the wire harness, and the bending segment is separated from the wire harness.

In such a configuration, when the wire harness is pulled so that its curved portion is reduced in diameter as the sliding structure is opened/closed, the elastic member is warped to bend at its intermediate bending portion. Therefore, the curved portion of the wire harness can be reduced in diameter so that the operation of opening/closing the sliding structure can be smoothly carried out and the curved portion can be greatly reduced in diameter by smaller force (than using a straight elastic member) Thus, the power supply structure inclusive of the protector can be downsized.

Particularly, the tip of the elastic member is secured to the wire harness and the intermediate portion of the elastic member is separated from the wire harness so that a gap is formed between itself and the wire harness. For this reason, the wire harness can be easily bent at a small curvature of radius so as to fill the gap. Thus, the curved portion of the wire harness can be reduced in diameter by small force.

In a preferred embodiment, the elastic member is composed of a flat spring segment in contact with a curved inner face of the wire harness and a spiral segment the center of which is fixed.

In such a configuration, the flat spring segment pushes up the wire harness in a curved shape and the spiral segment as well as the flat spring reduces the elastic member itself in diameter. Specifically, the combined function of the flat spring segment and the spiral segment reduces the curved portion of the wire harness in diameter by small force so that the sliding structure can be smoothly opened or closed by small force and the power supply structure inclusive of the protector corresponding to the curved portion can be downsized.

Particularly, since the flat spring segment curves along the spiral segment to constitute a part of the spiral segment, the elastic member can be reduced in diameter so that the curved portion of the wire harness can be reduced in diameter and the power supply structure can be miniaturized. Since the flat spring segment in contact with the inner curved face of the wire harness urges the curved portion in a pushing-up direction, it is not necessary to secure the elastic member to the wire harness. Unnecessity of the operation of securing reduces the production cost.

Preferably, the elastic member is provided with a harness supporting member at its tip.

In this configuration, when the wire harness expands/contracts in opening/closing the sliding structure, because of the harness supporting member, interference between the edge or tip of the elastic member and the wire harness or the corrugated tube with unevenness can be prevented. This permits the wire harness to expand or contract smoothly and its looseness to be absorbed.

Preferably, wherein the harness supporting member is thicker at least at its tip than the elastic member. In this configuration, interference between the edge or tip of the elastic member and the wire harness or the corrugated tube with unevenness can be prevented more surely.

Preferably, a curved portion of the wire harness and the elastic member are housed in a protector.

In this configuration, the curved portion of the wire harness and the elastic member can be protected from external interference and the wire harness is curved along the curved shape of the protector so that its initial shape is defined as a curved portion. This permits the operation of reducing or enlarging the diameter of the curved portion to be smoothly carried out and the looseness of the wire harness can surely be absorbed.

Preferably, the elastic member is secured to the protector at its stem.

In this configuration, when the stem of the elastic member is secured to the protector, the elastic member is cantilever-supported. Therefore, the urging force of lifting the wire harness can be surely exhibited. In addition, the protector and elastic member are integrated to provide a unit of the power supply structure.

Preferably, the stem has a first recess, the protector has an inserting portion corresponding to the stem, and the elastic member is secured to the inserting portion by a securing jig engaged with the recess.

In this configuration, since the elastic member is firmly secured to the inserting portion with the recess of the elastic member secured by the securing jig, even when strong pulling force is acted on the elastic member through the wire harness (in a direction of removing the elastic member) in closing/opening the sliding structure, the removal of the elastic member can be surely prevented. Thus, the urging of the wire harness by the elastic member (absorption of the looseness of the wire harness) can be carried out precisely so that the wire harness can be provided from being caught in between the sliding structure and the body. Further, since elastic member is firmly secured to the protector by the securing jig, it is not necessary to secure the elastic member to the stem of the wire harness by tape winding or band winding. Therefore, the troublesome operation of securing the wire harness having a sectional circular and elliptical shape along the elastic member in a sheet form is not required, thereby improving the operability of assembling. This effect can be further enhanced by the structure in which the securing jig is secured to the protector by securing means. Preferably, the inserting portion has a second recess having a shape similar to that of the first recess. Therefore, the securing jig can be simultaneously engaged with the first recess of the elastic member and the second jig of the inserting portion. This increases the securing force (force of preventing removal) of the elastic member. Therefore, the above effect can be further enhance, and the securing structure is simplified and its production cost can be reduced.

Preferably, the securing jig has elastic force enough to nip the inserting portion. In this case, the elastic member is inserted in the inserting portion and the inserting portion is nipped externally by the securing jig so that the elastic member can be secured to the inserting portion. This makes it unnecessary to use the securing means. This contributes to downsizing the sliding structure and saving the space thereof. This also simplifies the operation of assembling to improve the workability.

The above and other objects and features of the invention will be more apparent from the following description taken in conjunction with the accompanying drawings.

BRIEF DESCRIPTION OF THE DRAWINGS

FIG. 4 is a perspective view showing the function of absorbing the warp of the wire harness when the sliding structure is opened;

FIGS. 10A, 10B, 10C and 10D are a plan view, a front view, a side view and a bottom view of the elastic member, respectively;

FIGS. 18A and 18B are a front view and a plan view of an elastic member used in the fourth embodiment, respectively;

FIG. 25 is a perspective view when the slide door has been fully opened in the seventh embodiment.

DESCRIPTION OF THE PREFERRED EMBODIMENTS

Figure 1:
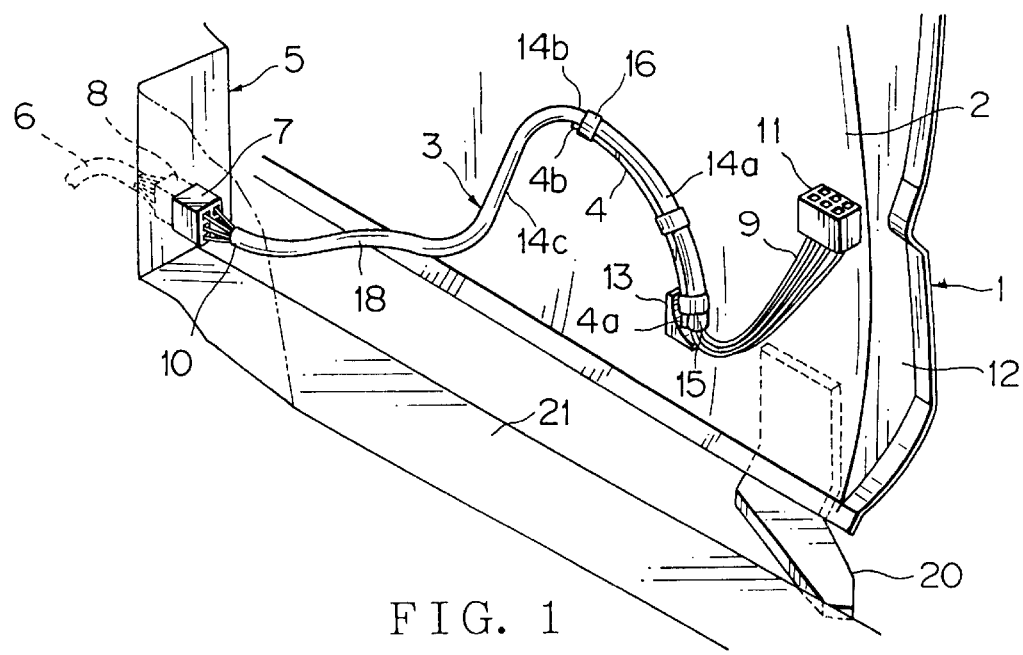
FIG. 1 is a perspective view of a first embodiment of a power supply structure of a slide door according to this invention.

Now referring to the drawings, an explanation will be given of various embodiments of this invention.

Embodiment 1

FIGS. 1 to 5 show the first embodiment of the power supply structure of a sliding structure according to this invention.

In this configuration, the one end of a wire harness 3 is fixed to a panel 2 inside a slide door (sliding structure) 1. An elastic member 4 is extended in a longitudinal direction of the wire harness 3 from the fixed side of the wire harness 3 so that the wire harness 3 is urged/supported in its upward-curved state. The other end of the wire harness 3 is hung over from the slide door 1 to the vehicle body 5 so that it is connected to the wire harness 6 on the side of the vehicle body 5 through male and female connectors 7 and 8.

In FIG. 1, the slide door 1 is in the closed state in which the wire harness 3 has been pulled and extended. The elastic member 4 is in contact with the curved inner face 14d (FIG. 2) of the wire harness 3 and hence greatly curved in an arc in proportion to the pulling force of the wire harness. The wire harness 3 is urged outward (upward) like arrow x owing to repulsion force of the wire harness 3. The elastic member 4 is curved against the pulling force of the wire harness 4.

In this embodiment, the wire harness 3 is composed of a plurality of electric wires 9, a corrugated tube 10 of synthetic resin which protectively sheathes the electric wires tied in bundle, and two connectors 7 and 11 arranged at both ends of the plurality of wires 9. The corrugated tube 10 has increased flexion with alternately successive projections and depressions (not shown) each having a square wave shape in section. For example, the corrugated tube has a slit-like cutting portion (not shown) for wire insertion in the longitudinal direction. The corrugated tube 10 is fit over the wire harness 3 between both ends thereof. The connector 11 is composed of terminals connected to the respective wires not shown (e.g. by crimping) and a connector housing 11 of synthetic resin for housing the respective terminals.

The plurality of electric wires may be tied in bundle by a cylindrical vinyl tube (not shown), vinyl tape, tying band, etc. instead of the corrugated tube 10. Otherwise, the wire harness 3 may be a single cabtyre cable. In this case, the sheathing material such as the corrugated tube is not necessary.

The wire harness 3 is secured to the panel 2 by a fixing means 13 in the vicinity of the front end of the slide door 1. The fixing means 13 may be any means which supports a substantially vertical tangling segment 15 at the front end of the curved portion 14 (FIG. 2) of the wire harness 3. For example, the fixing means may be a clamp, band or a pair of opposite flexible clips. The fixing means 13 is secured to the panel 2 of the slide door 1 while it holds the wire harness 3.

The one end of the wire harness 3 may be fixedly sandwiched between the arc-shaped inner wall of a semi-circular concave space (not shown) formed for accommodating the curved portion 3 of the wire harness 14 and the above fixing means. In place of the concave space, an arc-shaped protector (not shown) may be employed.

In this embodiment, the one end of the corrugated tube 10 is cut at the position of the fixing means 13. However, it may be extended to the connector 11 at the one end of the wire harness 3. The front portion of the wire harness 3 from the fixing means 13 is arranged upward. The connector 11 at the one end is connected to the functional component (not shown) within the slide door 1 directly or indirectly through a lead wire and connector (not shown).

Figure 2:
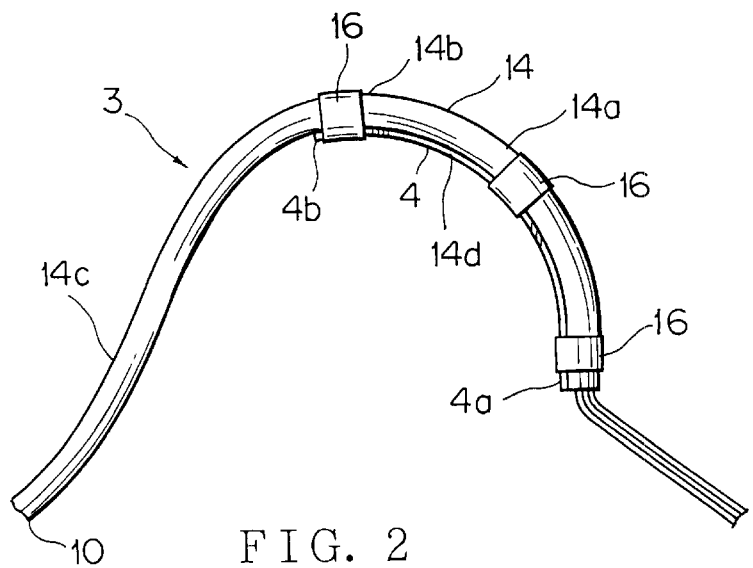
FIG. 2 is a front view of a main portion of the power supply structure.
Figure 3A:
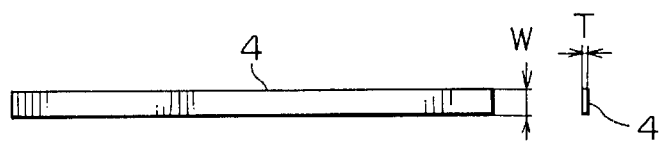
FIGS. 3A and 3B are a plan view and a side view of an elastic member used in this structure, respectively.
Figure 3B:
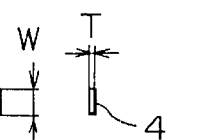

As seen from FIG. 2, the wire harness 3 is curved upward in a semi-circular shape. The expression "curved upward" means that the center of the arc is situated below the curved portion 14. The shape of the curved portion 14 may not be a complete arc with equal diameters, but may be bent in a curve.

An elastic member 4 is located at the front half 14a of the curved portion 14. The elastic member 4 is secured to the outer surface of the corrugated tube 10 using a plurality of securing members 16. The securing member 16 may be a band, clamp or adhesive vinyl tape. The band may be an existing tying band capable of tying a bundle of electric wires of the wire harness 3. The clamp may be a ring-shaped member of e.g. metal or synthetic resin. The clamp serves to clamp the elastic member on the corrugated tube 10.

The securing means 16 may have projections which are engaged with the depressions (not shown) of the corrugated tube 10 so that slippage of the securing means can be prevented. The engagement means composed of the projections and depressions may be also applied to the above fixing means 13 (FIG. 1) for the wire harness 3. The fixing means 16 may be formed integrally to the elastic member 4.

The elastic member 4 serves to lift the wire harness 3 along the surface of the panel 2 of the slide door 1 in a curved shape. As seen from FIG. 2, the one end 4a of the elastic member 4 is erected vertically on the one side of the wire harness 3 whereas the other end 4b of the elastic member 4 reaches the apex or top 14b of the wire harness 3 and extends slightly therefrom toward the other side of the wire harness 3. Thus, the wire harness 3 is bent in a smooth curve with no zigzag.

The elastic member 4 is in face-contact (substantially point-contact) with the wire harness 3 throughout its length, and urges uniformly outwardly the curved portion of the wire harness 3. Thus, the curved portion 14 is curved in a smooth curve so that it can expand or contract smoothly. The pulling force acting on the wire harness 3 is dispersed uniformly so that undue stress is not applied to the curved portion.

The elastic member 4 can be made shorter than that in FIG. 2 so that the other end 4b of the elastic member 4 is situated at a lower position than the apex of the curved portion 14. This permits the wire harness 3 to be lifted elastically since the wire harness 3 itself has certain elasticity (restorableness).

The elastic member 4 may be a lengthy flat spring formed by forming a metallic plate or synthetic resin for the spring. The elastic member 4 has flexibility and elasticity in a direction of a plate thickness. The thickness T and width W of the elastic member 4 are suitably set according to the diameter and length, i.e. force required for restoring.

In the case where the force required for restoration is small, a bar-like elastic member (not shown) may be used. The section of the elastic member 4 in FIG. 3B can be bent in a <-shape to increase its elasticity. The shape of the elastic member 4 should not be limited to these shapes. Otherwise, the wire harness 3 may be passed through the inside of a coil spring (not shown) serving as the elastic member.

In FIG. 1, the slide door 1 is in a closed or substantially closed state. The wire harness 3 is curved from the vicinity of the front end 12 of the slide door 1 to the middle portion thereof. The wire harness 14 communicates with the vehicle body via a straight portion 18 from its curved portion. The communicating portion from the slide door 1 to the vehicle body 5 (portion inclusive of the straight portion 18) is extended aslant in a direction leaving from the panel 2 of the slide door 1.

The front half 14a of the curved portion 14 is supported by the elastic member 4. The wire harness 3 at the one end of the elastic member 4 is secured to the slide door 1. At least the front half 14a of the curved portion 14, therefore, can be bent along the surface of the panel 2 of the slide door 1. The rear half 14c of the curved portion 14 is released from the elastic member 4 so that it can be bent apart from the panel.

The one side of the curved portion 14 is not fixed on the panel 2, but the curved portion 14 is made rotatable in a direction leaving from the panel 2 at a fulcrum of the fixing means on the lower side so that the front half of the curved portion 14 is also bent in a state apart from the panel 2.

The one end 4a of the elastic member 4 can be also secured to the slide door 1. In this case, the one end 4a of the elastic member 4 serves as a fixing means for fixing the wire harness 3. Likewise, the wire harness 3 is secured to the elastic member 4 by the securing means 16. The wire harness 3 can be supported by a supporting member (not shown) instead of the securing member 16. Only the apex 14b of the curved portion 14 of the wire harness 3 or only the lower part of the front half 14a of the curved portion 14 can be secured or supported by the upper end of the elastic member 14 so that the other portion of the curved portion 14 is apart from the elastic member 4.

In FIG. 1, reference numeral 20 denotes a sliding portion which slidably engages the lower portion of the slide door 1 with the guide rail of the vehicle body 5. Reference numeral 21 denotes a step portion of the vehicle body 5. The wire harness 3 is connected to the wire harness 6 on the vehicle body through the connectors 7 and 8 at the rear end of the step portion 21.

In the closed state of the slide door 1 shown in FIG. 1, the wire harness 3 is supported by the elastic member 4 and pulled into a curved state. Therefore, excessive tension is not acted on the wire harness and undue stress is not applied to each of the electric wires 9 of the wire harness 3. This also applies to the case where the electric wires 9 which are shorter than a prescribed value have been made in the step of manufacturing the wire harness and the stroke of the slide door 1 is larger than a prescribed value. Further, since the wire harness 3 is always located at a prescribed position, the wire harness 3 does not interfere with the component (not shown) attached to the vehicle 3 irrespectively of vibration while the vehicle runs. As a result, the wire harness 3 can be prevented from being damaged.

The spring force of the elastic member 4 may be set at a smaller value than in the case of FIG. 1, and the wire harness 3 may be made to have a shorter length. In this case, when the slide door 1 has been closed completely (the wire harness has been pulled), the elastic member 4 is curved deep more downward and hence curved slightly flatter than the state of FIG. 1.

As the slide door 1 is slid rearward to open from the fully closed state of the slide door 1 shown in FIG. 1, the wire harness 3 is contracted in an axial direction so that it is erected vertically by the force when the elastic member 4 is restored upward. Thus, the unnecessary looseness of the wire harness is absorbed or eliminated so that the wire harness 3 will not be caught in between the slide door 1 and the vehicle body 5.

As the slide door 1 moves rearward, the central position (center line in a vertical direction) of the curved portion 14 of the wire harness moves toward the vicinity of the slide door 1. The positions of the securing means 13 for the wire harness 3 and the one end 4a of the elastic member 4 are left unchanged. The curved portion 14 of the wire harness 3 approaches the rear end 21a of the step portion 21 of the vehicle body 5. Accordingly, the straight communicating portion 18 of the wire harness 3 in FIG. 1 is absorbed as apart (rear half 14c) of the curved portion 14.

In FIG. 4, the elastic member 4 does not become completely upright in a vertical direction, but is slightly warped rearward. In this case, the degree of warp varies according to the spring force of the elastic member 4. Use of the elastic member 4 with relatively small spring force greatly warps the wire harness 3. However, in this case also, the elastic member 4 must have spring force enough to absorb the unnecessary warp of the wire harness. The size (length) and spring force of the elastic member 4 can be set so that the elastic member 4 is completely upright in the fully opened state of the slide door.

In this case, the upper end 4b of the elastic member 4 warps at the apex 14c of the curved portion 14 of the wire harness 3 so that the wire harness 3 is bent in a smooth curve. This prevents the wire harness 3 from being bent so that undue stress is not applied to the wire harness 3 during the contraction (when the slide door 4 is closed). Further, since the elastic member 4 is arranged along the inner face 14d (FIG. 2) of the curved portion 14 of the wire harness 3, the warping operation of the elastic member 4 is executed smoothly so that the contraction and expansion of the curved portion 14 of the wire harness 3 can be executed smoothly and surely.

Where the wire harness 3 is accommodated in a semicircular space (not shown) of the panel 2 of the slide door 1, expansion of the wire harness 3 (FIG. 1) and contraction thereof (FIG. 4) are executed within the concave space. Where the curvature of radius of the concave is relatively small, in the contracted (or bent) state of the wire harness in FIG. 4, the front half 14a of the curved portion 14 along the elastic member 4 is kept in contact with the front half of the inner wall (not shown) of the concave space. In this case, the curvature of radius of the curved portion 14 substantially coincides with that of the inner wall so that further contraction of the curved portion 14 is stopped. Thus, the curved shape of the wire harness 3 is defined in a more smooth shape.

As the slide door 1 is slid in its closing direction or forward from its fully opened state, the wire harness 3 is extended gradually. Thus, the elastic member 4 is pulled rearward at a fulcrum of the fixing means located below so that it is greatly curved and deformed as shown in FIG. 1. As a result, the wire harness 3 is supported in a curved shape by the elastic member 4.

As the slide door 1 is closed, the wire harness 3 is pulled forward by the elastic member 4 and urged upward. Thus, the unnecessary looseness of the wire harness 3 is suppressed so that the wire harness 3 is prevented from being caught in between the slide door 1 and vehicle body 3. Even when the opening/closing stroke length of the slide door 1 has become in a moment longer than a prescribed opening/closing stroke length owing to any cause, the elastic member 4 secured to the wire harness 3 is warped rearward so that a change in the size is absorbed. As a result, excessive tension applied to the electric wires is reduced so that undue stress is not applied to the electric wires 9.

In this embodiment, on the side of the slide door 1, the elastic member 4 was arranged and the curved portion 14 of the wire harness 3 was formed. However, inversely, on the side of the vehicle body 5, the elastic member 4 may be arranged and the curved portion 14 of the wire harness 3 may be formed. In this case, the wire harness 3 is located in a format inverted by 180° in the longitudinal direction.

In the closed state of the slide door 1, the elastic member 4 having a long length may be arranged straight horizontally in parallel to the plane of the panel 2 of the slide door 1 (in FIG. 1, the elastic member 4 is orthogonal to the plane of the panel 2) so that the one end 4a and the other end of the elastic member 4 are located at the front and rear positions, respectively. In this case, when the slide door 1 has been opened, the elastic member 4 is curved rearward so that the wire harness 3 in a curved state is hung over the vehicle body 5. The configuration of this invention may be applied to the other sliding structure than the slide door 1, and the other body than the vehicle body 5. Further, where the elastic member 4 is not fixed but slidably supported by the wire harness 3, the elastic member 4 can be arranged not on the lower side of the curved portion of the wire harness 3 but the upper side thereof.

Embodiment 2

Figure 5:
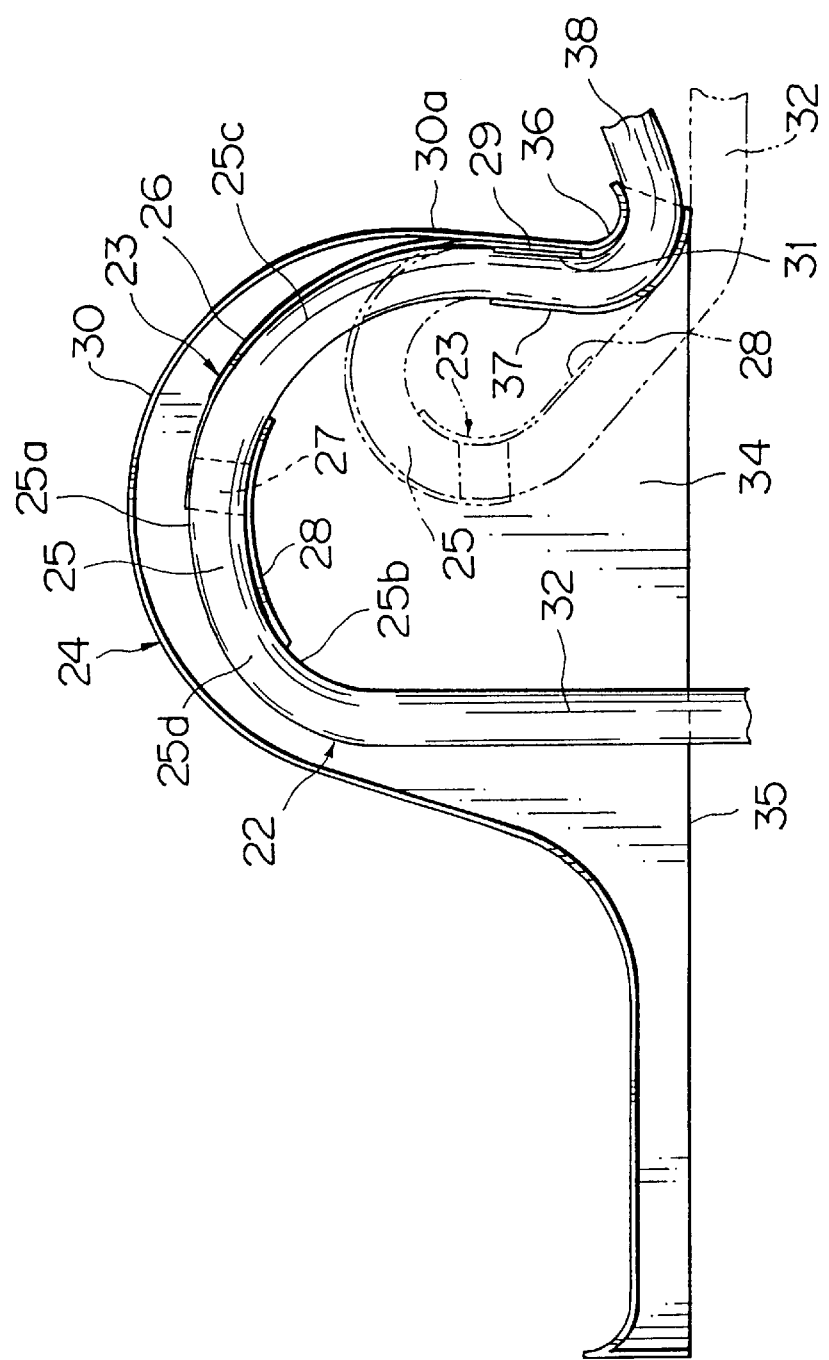
FIG. 5 is a front view showing the main portion of the second embodiment of the power supply structure in the slide structure according to this invention.
Figure 6:
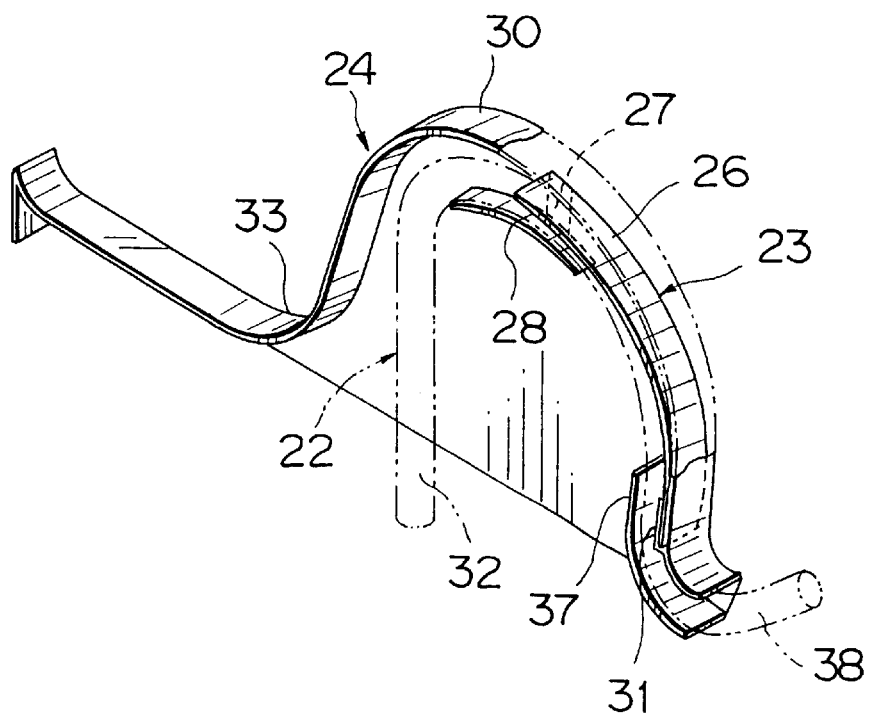
FIG. 6 is a perspective view showing the function of absorbing the warp of the wire harness when the sliding structure is closed.
Figure 7:
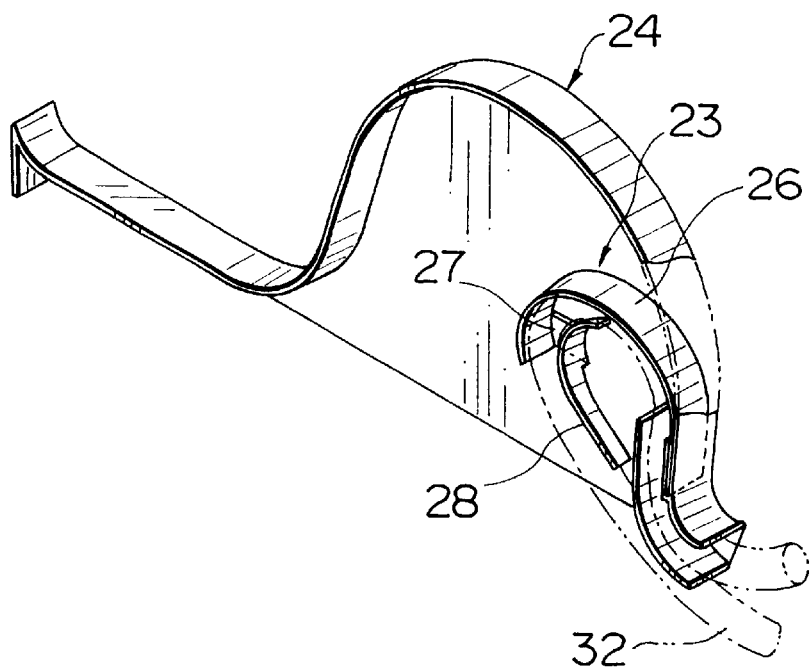
FIG. 7 is a perspective view showing the function of pulling the wire harness when the sliding structure is opened.

FIGS. 5 to 7 show a second embodiment of the power supply structure in the sliding structure according to this invention.

Figure 8:
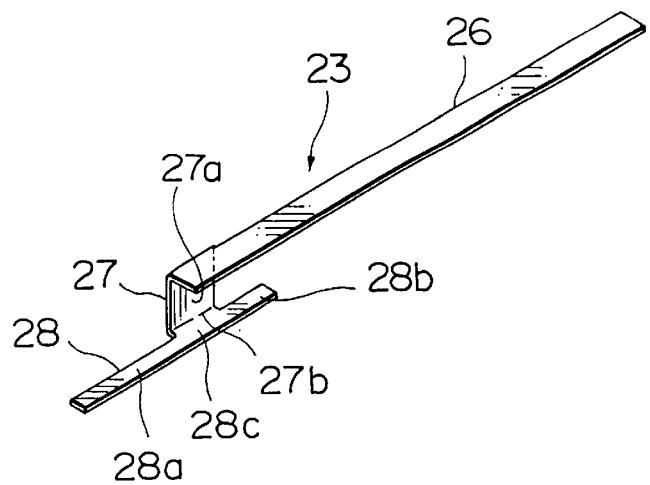
FIG. 8 is a perspective view of an elastic member used in the second embodiment.
Figure 9:
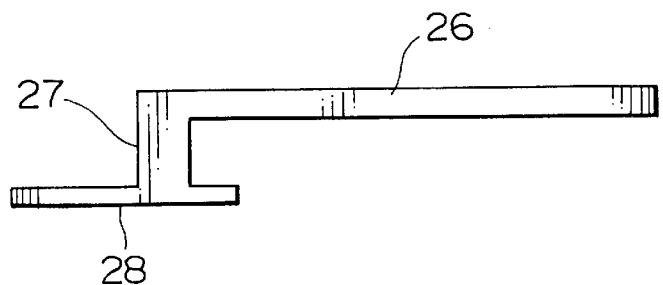
FIG. 9 is a developed view of the elastic member.

The solid line in FIG. 5 and the entity of FIG. 6 illustrate the state on the way of closing the slide door which is a sliding structure. The chain line in FIG. 5 and the entirety of FIG. 7 illustrate the fully opened state of the slide door. FIGS. 8 to 10 show an elastic member used in this embodiment.

In FIG. 5, reference numeral 22 denotes a wire harness; 23 an elastic member; and 24 a protector of synthetic resin. The wire harness 22 is accommodated within the protector 24 in its curved state. The one end of the protector 24 is secured to the one end of the protector 24. The elastic member 23 is arranged along the curved portion 25 of the wire harness 22 in the longitudinal direction.

As shown in FIG. 8, the elastic member 23 includes a first flat spring portion (first spring) 26 which is long and relatively wide, a sheet-like coupling portion 27 which is orthogonally integral to the side of the tip of the first flat spring portion 26 and a second flat spring portion (second spring) 28 which is successive in parallel to the first flat spring portion 26 through the coupling portion 27 and short and relatively narrow.

The second flat spring portion 28 is coupled with the coupling plate 27 at its one side of the intermediate portion thereof in the longitudinal direction so that the front side portion 28a is longer than the stem side portion 28b. The front side portion 28a protrudes forward from the first flat spring 26 and the stem side portion 28b is opposite to and in parallel to the first flat spring 26.

The coupling portion 27 includes an upright main portion 27a which is orthogonal to the first flat panel portion 26 and a horizontal and short subsidiary portion 27b which is orthogonal to the main portion 27a and successive to the second flat spring portion 28 in their flush planes. The first flat spring portion 26 has a width which is equal to the width W of the flat panel which serves as the elastic member 4 in the embodiment in FIG. 3.

The elastic member in this embodiment as shown in FIG. 8 and FIGS. 10A–10D can be easily made as follows. A sheet of steel for a spring is punched out to provide a developed shape using e.g. a punch and dice. The developed shape is bent. In FIG. 9, reference numeral 26 denotes a first flat spring portion; 27 a coupling portion; and 28 a second flat spring portion. The respective portions have the same thickness. The second flat spring portion 28 has smaller spring constant (spring force) than the first spring portion since former is more narrow than the latter.

Incidentally, an integral sheet of metallic plate can be used so that the first flat spring portion and the second flat spring portion have different thicknesses, i.e. spring constants. In this case, their widths may be equal for the respective spring members.

FIG. 10A is a top view of the elastic member 23, FIG. 10B is a front view thereof, FIG. 10C is a bottom view thereof, and FIG. 10D is a side view thereof.

As shown in FIGS. 10A and 10C, the center line (not shown) of the long and wide first flat spring portion 26 and that (not shown) of the short and narrow second flat spring portion 28 are located vertically flush with each other. Both flat spring portions 26 and 28 are kept in contact with the front and rear surfaces of the maximum diameter portion of the wire harness 22 (FIG. 5). Such a configuration can be realized in such a manner that the narrow second flat spring portion 28 is protruded in a direction leaving from the main part 27a via the short subsidiary part 27b of the coupling portion 27. The width of the second flat spring portion 28 is slightly larger than ½ of the first flat spring 26.

As shown in FIG. 10D, the coupling portion 27 and both flat spring portions 26, 28 form a shape in section. In FIG. 10B, the height of the vertical main part 27a of the coupling portion 27, i.e. distance between the first flat spring portion 26 and second flat spring portion 28 is approximately equal to or slightly shorter than the outer diameter of the wire harness (FIG. 5).

As seen from FIG. 10B, the first flat spring portion 26 and the second flat spring portion 28 are in parallel to each other in different levels. The front side portion 28a of the second flat spring portion protrudes forward long from the tip of the first flat spring portion 26, i.e. coupling portion 27, whereas the stem side portion 28b of the second flat spring portion 28 protrudes backward short from the coupling portion 27.

As seen from FIG. 5, the first flat spring portion 26 is arranged along the outer face 25a (curved outer face) of the curved portion 25 of the wire harness 22, i.e. on the side of the larger radius of curvature, whereas the second flat spring portion 28 is arranged along the inner face 25b (curved inner face) of the curved portion 25, i.e. on the side of the smaller radius of curvature. The curved portion 25 is sandwiched between the first flat spring 26 and the second flat spring 28 so that the elastic member 23 is firmly secured to the wire harness 22. In this way, since the curved portion 25 of the wire harness 22 is sandwiched by both spring portions 26 and 28, the securing means such as tape winding or band is not required. In addition, the operation of securing can be carried out easily and at low cost. The wire harness may be realized in any format in which its outer periphery is covered with a corrugated tube of resin or knitted tube, and wound by a vinyl tape.

The coupling portion 27 also serves as a stopper for positioning the wire harness 22, which brings the outer periphery of the curved portion 25 of the wire harness 22 into contact with the inner face of the coupling portion 27 so that the curved portion 25 and elastic member 23 are precisely positioned. In this way, since the wire harness 22 is kept in contact with the inner face of the coupling portion 28, combining the wire harness 22 with the elastic member 23 and vice versa can be easily implemented.

The stem portion of the elastic member 23, i.e. first flat spring portion 26 is secured to the inserting portion (securing portion) of the protector 24 of synthetic resin. In the vicinity of the bottom of the front end of the protector 24, the inserting portion 29 is formed as a slit between the inner face of the upright portion 30a of the peripheral wall 30 and an inner plate 31 in parallel thereto. The elastic member 23 can be inserted into the inserting portion 29 by a one-touch simple operation so that assembling of the elastic member 23 can be facilitated.

As indicated by solid line in FIG. 5, where the slide door (not shown) has been closed, the tip of the upper first flat spring portion 26 reaches the vicinity of the top of the curved portion 25 of the wire harness 22, while the lower second flat panel 28 is located in a range of the top of the curved portion 25 and its front and rear. The first flat spring portion 26 is curved in a larger diameter along the outer face 25a of the curved portion 26. The second flat spring portion 28 is curved along the inner face 25b of the curved portion 25.

The long front side part 28a and short stem side part 28b of the second flat spring portion 28 with respect to a boundary of the coupling portion 27 are kept in contact with the curved portion 25 of the wire harness 22. The stem side part 28b is located oppositely to the first flat panel portion 26 to hold the curved portion 25 stably. In the absence of the stem side part 28b, only the front side part 28a protrudes from the coupling portion 27. This weakens the force of supporting the curved portion 25, i.e. spring force. Since the first flat spring portion 26 and the stem part 28b of the second flat spring portion 28 are located oppositely to each other up and down, the urging force of raising the wire harness 22 is increased without increasing the length of the elastic member 23 so that the looseness of the wire harness 22 can be absorbed efficiently.

The curved portion 25 of the wire harness 22 is urged upwards against its own weight by the sum of spring force of the first flat panel portion 26 and the second flat panel portion 28. The first flat panel portion 26 pulls up the front half 25c of the curved portion 25c, whereas the second flat spring portion 28 pushes up the top of the curved portion 25c and its vicinity (inclusive of the rear half of the curved portion 25). The pulling-up force of the first flat spring portion 26 is transmitted through the coupling portion 27 to a supporting portion 28c (FIG. 8) of the second flat spring portion 28 which intersects the coupling portion 27 so that the vicinity of the curved portion 25 is pulled up at the supporting portion 28c. In addition, the second flat spring portion 28 urges upwards the rear half 25d of the curved portion 25.

The portion 32 successive to the rear half 25d of the curved portion 25 of the wire harness 22 is located substantially vertically downward as shown in FIG. 5 while the slide door is closed, for example. When the slide door has been fully closed, the portion 32 is pulled backward along the rear skirt portion of the protector 24.

The protector 24 includes a vertical plate 34 in contact with the inner panel of the slide door, a peripheral wall 30 curved along the upper edge of the vertical plate 34 and a cover (not shown) covering the plate 34 in opposition thereto. The protector 24 accommodates the curved portion 25 of the wire harness 22 so that it is protected against outside interference. Its lower portion opposite to the peripheral wall 30 is opened to form a lower opening 35. The portion of the rear half side of the wire harness 22 is derived and arranged to extend to the vehicle body.

Inside the portion 36 bent in a J-shape at the front end of the curved portion of the peripheral wall 30, an inner wall 37 having substantially the same shape is formed. A front deriving portion 38 of the wire harness 22 is supported between the bent portion 36 and the inner wall 37. The inserting portion 29 is formed along the bent portion 36. The upper end of the inserting portion 29 and upper end of the inner wall 37 are flush with each other. The bent portion 36 and the inner wall constitute a harness supporting portion.

Since the curved portion 25 of the wire harness is cantilever-supported by the front end of the protector 24, the harness portion near to the harness supporting portion can be sufficiently supported by the first flat spring portion 26 having high spring constant, whereas the harness portion far from the harness supporting portion can be sufficiently supported by the second flat spring portion 28.

As indicated by dotted line in FIGS. 5 and 7, when the slide door has been opened, the rear portion 32 of the wire harness is pulled forward so that the curvature of radius of the curved portion 25 is reduced. Thus, the elastic member 23 is bent strongly to form a small diameter. The elastic member 23 is bent over a length exceeding a semi-circle so that the tip of the second flat spring 28 is brought into contact with the inner wall 37 of the elastic member 23.

In this case, since the spring constant of the second flat spring is smaller than that of the first flat spring portion 26, the second flat spring portion 28 is apt to warp together with the harness portion far from the harness supporting portion by small force. Thus, the diameter of the curved portion 25 of the wire harness 22 can be reduced greatly and smoothly. Accordingly, the slide door can be opened smoothly by small force.

Since the diameter of the curved portion 25 is reduced greatly, the initial diameter of the wire harness 22 in the operation of closing the slide door indicated by solid line in FIG. 5 can be set at a small value so that the protector 24 can be downsized. Downsizing of the protector 24 reduces the space for attachment within a slide door and increases the freedom of arranging other functional components.

While the slide door is closed forward from the opened state of the slide door indicated by dotted line in FIG. 5 (the protector 24 moves forward integrally to the slide door), the diameter of the curved portion 25 of the wire harness 22 is gradually increased. Concurrently with this, the elastic member 23 upwards urges the curved portion 23 so that the looseness of the curved portion 25 is absorbed. In this case, since the second flat spring portion 28 extends long backward to exceed the top of the curved portion 25, the elastic force of the second flat spring portion 28 pushes up the curved portion 25 swiftly, surely and smoothly. Thus, also when the curved portion is curved with a large diameter as indicated in solid line, it can be surely supported with no downward bending by the second flat spring portion 28.

Embodiment 3

Figure 11:
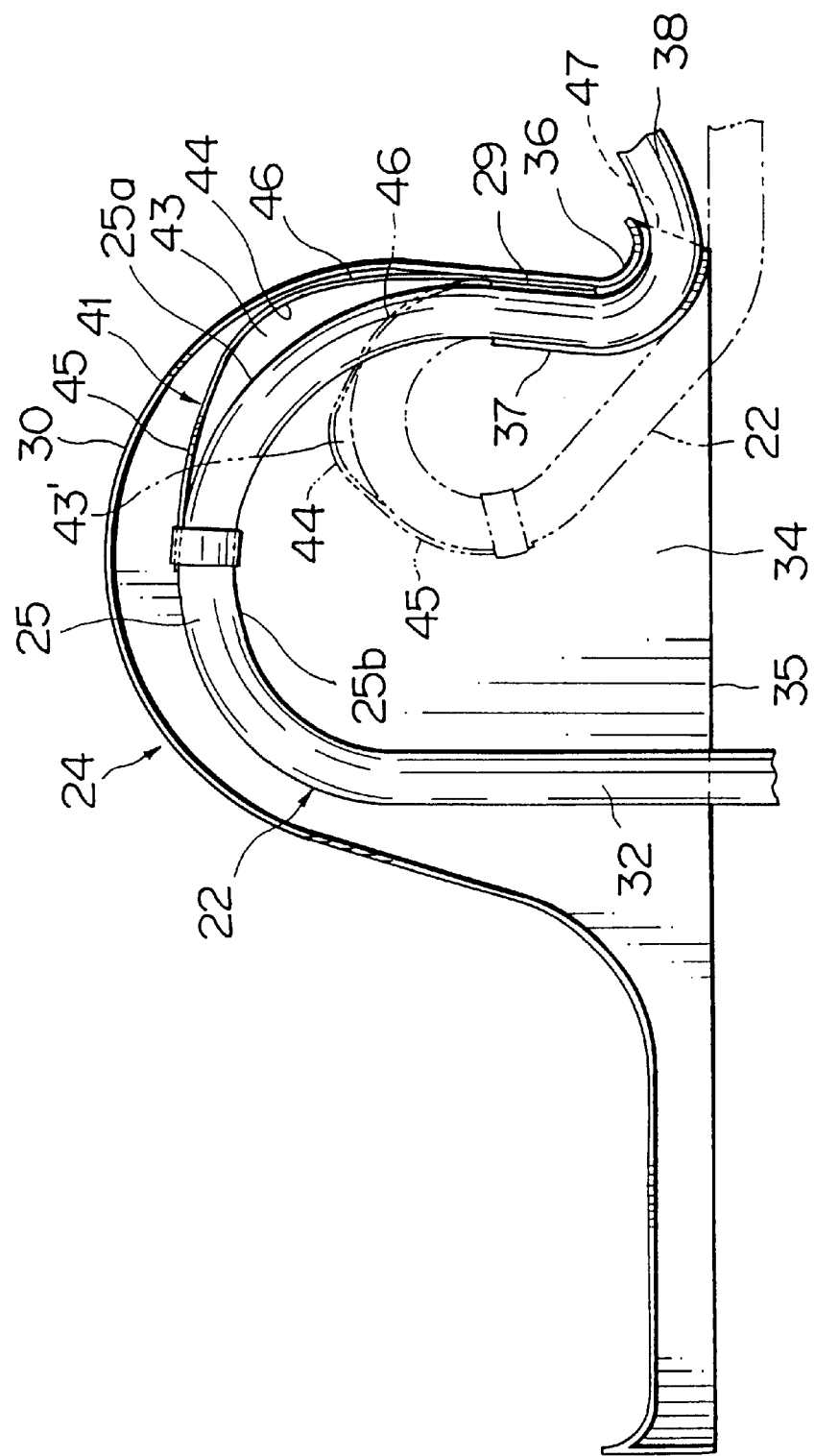
FIG. 11 is a front view showing the main portion of the third embodiment of the power supply structure in the slide structure according to this invention.
Figure 12:
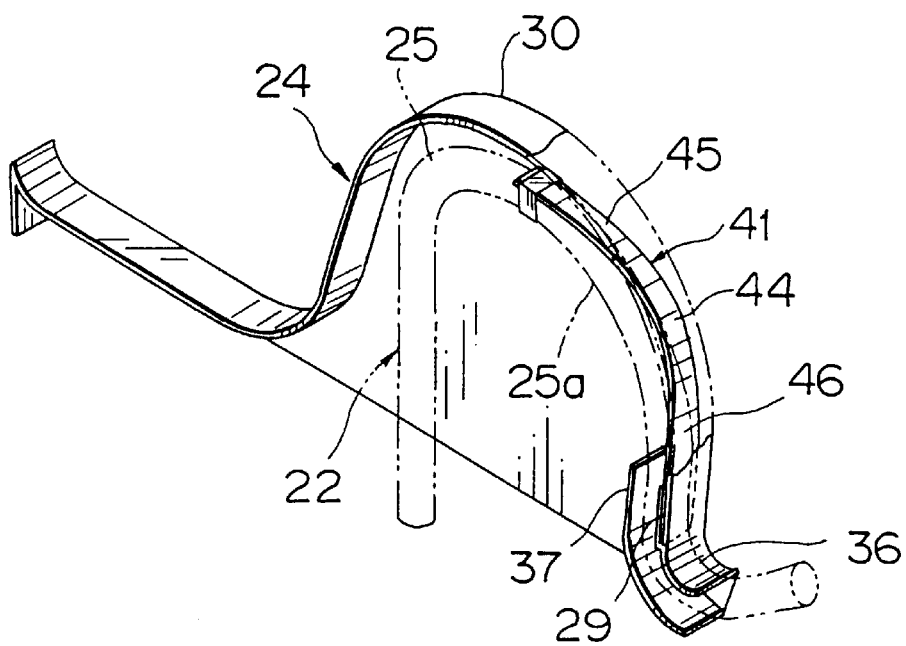
FIG. 12 is a perspective view showing the function of absorbing the warp of the wire harness when the sliding structure is closed.
Figure 13:
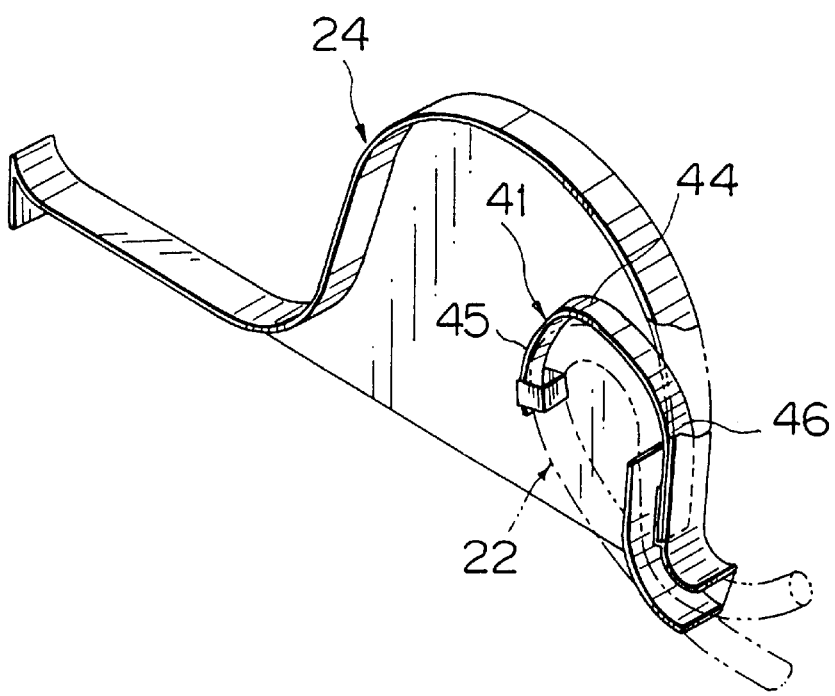
FIG. 13 is a perspective view showing the function of pulling the wire harness when the sliding structure is opened.

FIGS. 11 to 13 show a third embodiment of the power supply structure in a sliding structure.

Figure 14A:
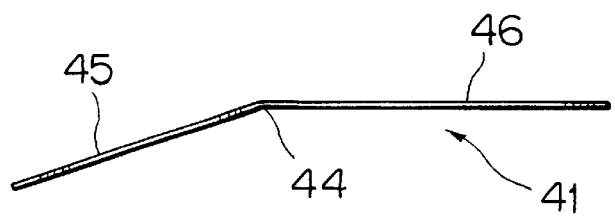
FIGS. 14A and 14B are a front view and a plan view of an elastic member used in the third embodiment, respectively.
Figure 14B:
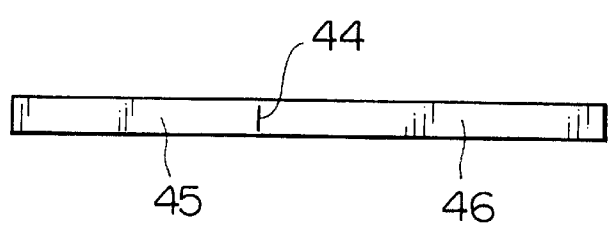

The solid line portion of FIG. 11 and FIG. 12 show the state while the slide door which is a sliding structure is closed. The chain line portion of FIG. 11 and FIG. 13 show the state when the slide door has been fully opened. FIGS. 14A and 14B show elastic members employed in this embodiment.

The feature of the power supply structure according to this embodiment resides in that a flat spring bent in an inverted-< shape is employed as an elastic member 41 for absorbing the looseness of the wire harness 22 within the protector 24 and is arranged along the curved outer surface 25a of the wire harness 22. Incidentally, the inverted-< shape refers to the shape when the elastic member is viewed from the front. It is the < shape when viewed from the rear.

As seen from the solid line in FIG. 11 and FIG. 12, the one end of the elastic member 41 is secured to the bottom of the front end of the protector 24 in a state bent in an inverted < shape, whereas the other end thereof is secured to the top of the curved portion 25 of the wire harness 22. As in the previous embodiment, the one end of the elastic member 41 is secured at the inserting portion 29, whereas the other end thereof is secured to the wire harness 22 by the securing means such as tape winding or band.

The other portion of the elastic member 41 than both ends thereof is separated outwardly from the outer periphery of the wire harness 22 so that a crescent-shaped large gap 43 is formed between the wire harness 22 and the elastic member 41. The bending portion 44 of the elastic member 41 has a smaller curvature of radius than that of the curved portion 25 of the wire harness 22 opposite thereto. The format of the protector 24, in which like reference numerals refer to like elements in the previous embodiment, will not be explained here in detail.

In the state where the slide door is closed, the bending portion 44 at the intermediate position in the longitudinal direction of the elastic member 41 is in contact with the inner surface of the curved portion of the peripheral wall 30 of the protector 24. Therefore, the curved portion 25 of the wire harness 22 is kept in a state curved precisely in an inverted-U shape, and interference between the curved portion 25 and the inner face of the protector 24 is surely prevented.

Since the elastic member 41 is bent in the inverted-< shape at its intermediate position in the longitudinal direction and its bending portion is not secured to the wire harness 22, the curving operation of the wire harness 22, particularly, the operation of reducing the diameter of the curved portion as indicated by dotted line can be carried out smoothly by small force. In addition, the curved portion can be warped in a very small diameter.

Specifically, as shown in FIGS. 14A and 14B, since the elastic member 41 in a belt-shape is plastically deformed in the inverted-< shape in its initial state, the elastic member 41 is apt to bend in the inverted-< shape from the intermediate bending position 44. Further, since the elastic member 41 is secured to the wire harness at only its both ends and separated therefrom at its intermediate portion, the sliding friction between the wire harness 22 and elastic member 41 during the warping is zero. This permits the wire harness to be warped smoothly by small force.

As seen from FIGS. 14A and 14B, the elastic member 41 is formed in a thin and uniform thickness, and bent in the inverted-< at the position slightly near to the tip from the middle position in the longitudinal direction. A slightly short portion 45 on the tip side with respect to the boundary of the bending position 45 is secured to the substantial top of the curved portion 15 of the wire harness 22. A slightly long portion 46 on the stem side is secured to the inserting portion 29 of the protector 29. As indicated by solid line in FIG. 11, the long front half portion 46 of the elastic member 41 is substantially vertically upright, whereas the short rear half 45 slants slightly upward from the horizon to support the wire harness 22.

While the slide door is opened backward, the rear half portion 45 slanted slightly upward bends downward and warps at a fulcrum of the bending position 44. Subsequently or substantially concurrently, the upright front half portion 46 warps backward so that the diameter of the elastic member 41 as well as the wire harness 22 is reduced. Thus, the wire harness 22 warps in a semi-circular shape within a range of the length of the elastic member 41. The bending position of the elastic member 41 rotates by about 90°. The front half portion 46 and rear half portion 45 of the elastic member 41 warps in an arc shape along the wire harness 22. In the state where the slide door has been fully opened as indicated by chain line, the bending position 44 of the elastic member 41 is slightly apart outwardly from the wire harness 22. Thus, a small crescent-shaped gap 43' is created between the bending portion 44 and the wire harness 22.

As a result, in the structure as shown in FIG. 11, the elastic member 41 is secured to the protector 24 at its one end so that the wire harness 22 is supported by the protector 24, and is secured to the wire harness 22 at its other end so that a large crescent-shaped gap is created between the elastic member and the wire harness 22 in the closed state of the slide door indicated by solid line. In such a structure, as indicated by chain line, the wire harness 22 can be warped with a reducing diameter by small force while the slide door is opened. The operation of reducing the diameter of the wire harness 22 can be carried out smoothly by small force until the elastic member 41 is brought into contact with the wire harness 22 with no gap (this does not occur actually).

Where the elastic member 41 is kept in contact with the wire harness 22 in the state indicated by solid line, the operation of reducing the diameter of the wire harness 22 requires great force because the elastic member 41 is forcibly bent in a state where the elastic member 41 is stretched, and does not permit the diameter to be greatly reduced. On the other hand, in accordance with this embodiment, the curved portion 25 of the wire harness 22 can be reduced in a small diameter by small force. This contribute to reduce the force of driving the slide door and downsize the protector 24.

As in the previous embodiment, the protector 24 includes a base plate 34, a peripheral wall 30 and a cover (not shown). On the side of the front end of the peripheral wall 30, the inserting portion (fixing portion) 29 for the elastic member 41 and the harness supporting portion 36, 37 are formed. The harness portion 38 derived from the front opening 47 of the protector 24 is connector-connected to the functional components within the slide door, whereas the harness portion 32 derived from the lower opening 35 is extended to the side of the vehicle body (power supply side) and connected to the wire harness (not shown) on the side thereof. While the slide door is opened or closed, the harness portion 32 shuttles to and fro in the lower opening 35. Concurrently, the diameter of the curved portion 25 of the wire harness 22 is reduced or enlarged.

In this way, since the elastic member 41 in an inverted-< shape is arranged on the outer surface 25a of the curved portion 25 and is secured at only both ends and free in the intermediate portion, the wire harness 22 can be warped in a reduced diameter by small force. For example, where an elastic member (not shown) is arranged on the inner surface 25b of the curved portion of the wire harness 22, the elastic member 41 is made free at the intermediate portion and may be provided with a bending portion or flexible portion to prevent interference with the wire harness. The elastic member 41 can be made of synthetic resin so as to be integral to the protector 24. The elastic member 41 which is metallic may be molded to the protector 24.

Embodiment 4

Figure 15:
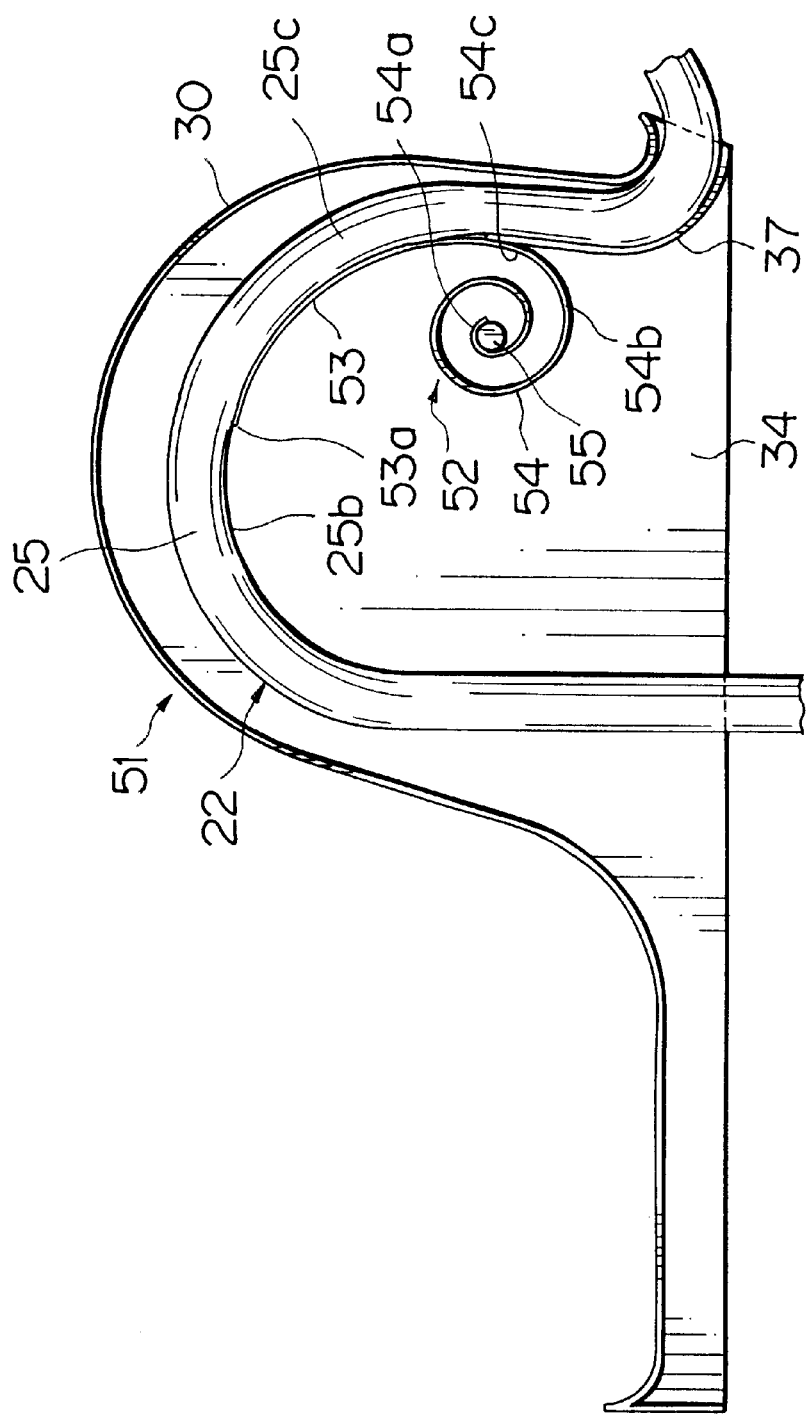
FIG. 15 is a front view showing the main portion of the fourth embodiment of the power supply structure in the slide structure according to this invention.
Figure 16:
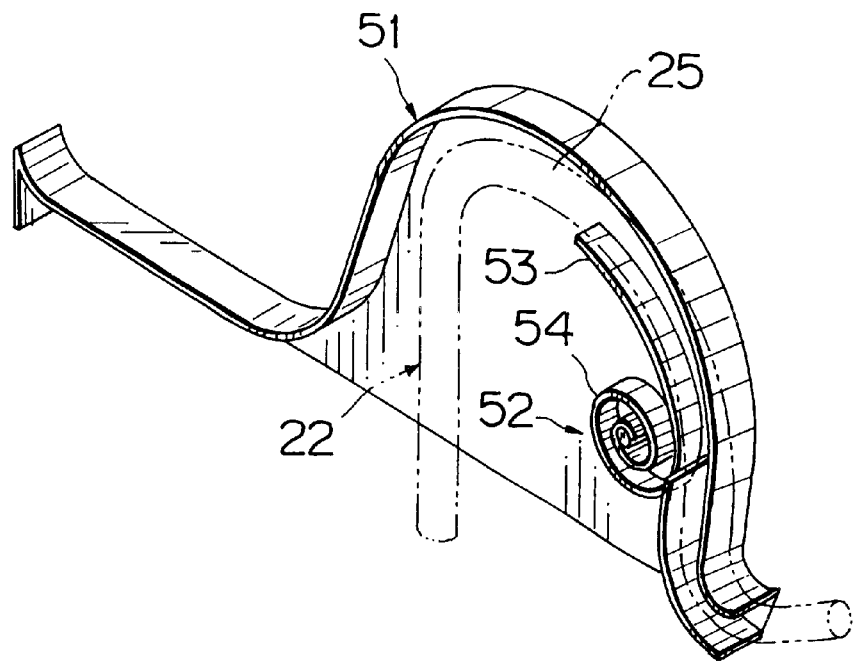
FIG. 16 is a perspective view showing the function of absorbing the warp of the wire harness when the sliding structure is closed.
Figure 17:
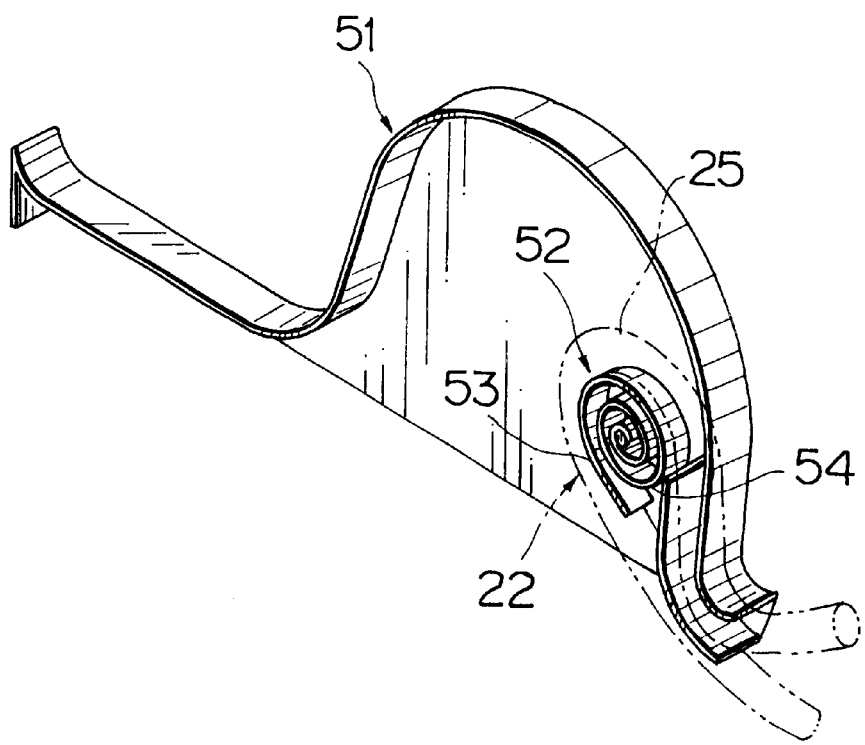
FIG. 17 is a perspective view showing the function of pulling the wire harness when the sliding structure is opened.

FIGS. 15 to 17 show a fourth embodiment of a power supply structure in a sliding structure according to this invention.

FIGS. 15 and 16 show the state while the slide door which is a sliding structure is closed. The chain line portion of FIG. 17 shows the state when the slide door has been fully opened. FIGS. 18A and 18B are elastic members employed in this embodiment.

As shown in FIGS. 15 to 17, the feature of the power supply structure according to this embodiment resides in that a spiral elastic member 52 is arranged along the inner face 25*b* of the curved portion 25 of the wire harness 22 within a protector 51 made of synthetic resin.

As seen from FIGS. 18A and 18B, the elastic member 52 is composed of a linearly straight flat spring segment 53 in a free state (initial state) and a spiral segment 54 successive thereto. The flat spring segment 53 has a length enough to reach the vicinity of the top of the curved portion 25 along the front half 25*c* thereof in a state where the elastic member 52 is set within the protector 51 as shown in FIG. 15. The spiral segment 54 is wound clockwise (when viewed from the front) with a gradually reducing diameter at number of turns of two or so. The spiral segment 54 is located on the lower side or left side against the flat spring segment 53. The spiral segment 54 and flat spring segment 53 are smoothly successive in the tangent direction.

As shown in FIG. 15, the spiral segment 54 of the elastic member 52 is supported at a center (or stem) by a shaft 55 of the protector 51. In this state, the flat spring segment 53 curved in an arc is brought into contact with the inner face 25*b* of the curved portion 25 of the wire harness 22 so that the wire harness 22 is elastically urged in an upright direction. The wire harness 22 is supported by the flat spring segment in a state where it is curved in a semicircular shape.

For example, the shaft 55 horizontally protrudes from the vertical base plate 34 of the protector 51. The shaft 55 is engaged with the inside of a semicircular portion 54*a* at the center of the spiral segment 54 so that the center of the spiral segment 54 is positioned. Otherwise, the center of the spiral segment 54 may be fixed by the shaft having an arc-shaped groove with which the semi-circular portion 54*a* is to be engaged. In this embodiment, the inserting portion 29 in the protector 24 (FIG. 11) in the previous embodiment is not required and so the structure on the side of the peripheral wall 30 of the protector 51 is simplified. The remaining shape of the protector 51, in which like reference numerals refer to like elements in the previous embodiment, will not be explained here in detail.

In the tangent direction, the outermost portion 54*b* of the spiral segment 54 is smoothly brought into contact with the lower portion of the front half portion 25*c* of the curved portion 25 of the wire harness 22. The flat spring segment 53 is curved along the inner face 25*b* of the curved portion 25 and extends upward. The tip 53*a* of the flat spring segment 53 reaches the vicinity of the top of the curved portion 25. The portion 54*c* at the boundary between the spiral segment 54 and flat spring segment of the elastic member 52 is located in approximate contact with the inner wall 37 of the protector 51. Thus, the wire harness 22 is raised upwards along the inner wall 37 and the elastic member 52 is in contact with the wire harness 22 in the tangent direction.

It is not necessary to secure the elastic member 52 to the wire harness 22. Since the curved portion 25 of the wire harness 22 is positioned with no backlash to a certain degree in the horizontal direction within the protector 51 covered with the cover (not shown), even when the elastic member 52 is not secured to the curved portion 25, the curved portion 25 does not deviate from the elastic member 52. Since it is not necessary to the elastic member 52 to the wire harness 22, the operation of assembling the wire harness 22 is facilitated. In addition, the flat spring portion 53 is brought into slidable contact with the inner face 25*b* of the curved portion 25 of the wire harness 22 so that the diameter of the curved portion 25 can be reduced or enlarged by small force.

As seen from FIG. 17, while the slide door is opened, the flat spring segment 53 is curved in a reducing diameter to constitute a portion of the spiral segment 54 (becomes spiral) Thus, the elastic member 52 becomes small in the reduced diameter as if a spring is wound. Simultaneously, the curved portion of the wire harness 22 becomes small in the reduced diameter. This permits the looseness of the wire harness 22 to be efficiently absorbed and the protector 51 to be downsized.

Specifically, even when the protector 51 is formed in a small size so that the curved portion 25 of the wire harness 22 has a small diameter when the slide door is closed as shown in FIG. 16, the curved portion 25 of the wire harness 22 can have a very small diameter when the slide door has been opened so that the looseness of the wire harness 22 can be absorbed precisely.

The spiral segment 54 in FIG. 17 has a more reduced diameter than the spiral segment 54 in FIG. 16 has. As the elastic member 52 becomes small as if the spring is wound, it stores gradually increasing elastic force (restoring force). In this state, since the slide door is closed forward, as shown in FIG. 16, the curved portion 25 of the wire harness 22 surely increases its own diameter because of the restoring force of the elastic member 52. Thus, the looseness of the wire harness 22 is absorbed accurately so that the wire harness 22 is raised in an arc shape.

The force required for the elastic member 52 to reduce its own diameter as if a spring is wound from the state of FIG. 16 is smaller than that required for a flat spring to warp to its own diameter. Therefore, the operation of opening the slide door can be carried out by small force. Specifically, the force required for warping the elastic member is negligibly smaller than that required for opening the slide door so that it does not influence the operability of the slide door.

While the slide door is closed forward from the closed state of the slide door in FIG. 17 (the protector 51 moves forward integrally to the slide door), urging of the elastic member 52 in a spring shape is released so that the operating force of the slide door tends to reduce.

Embodiment 5

Figure 19:
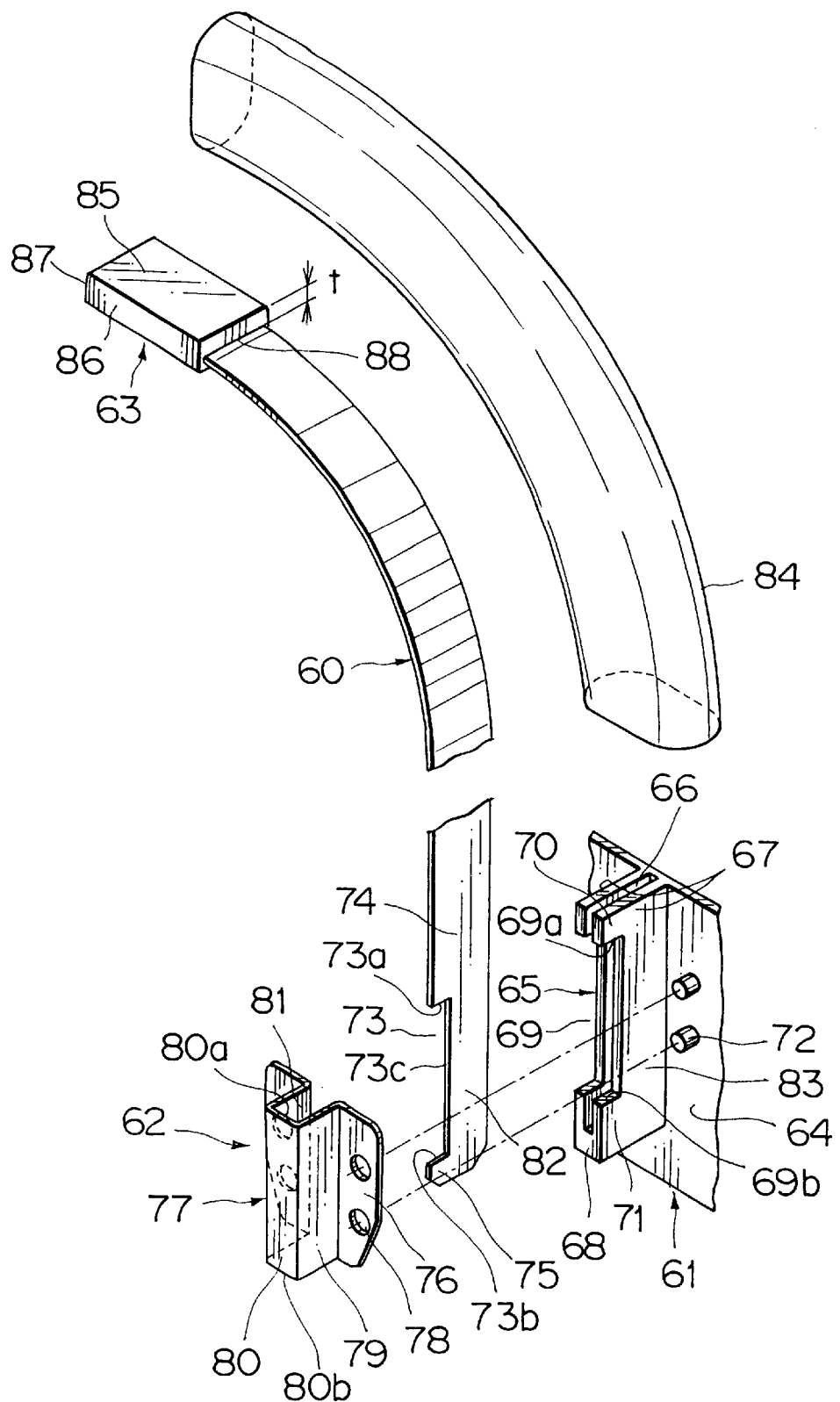
FIG. 19 is an assembled perspective view of a fifth embodiment of the power supply structure of the sliding structure according to this invention.
Figure 20:
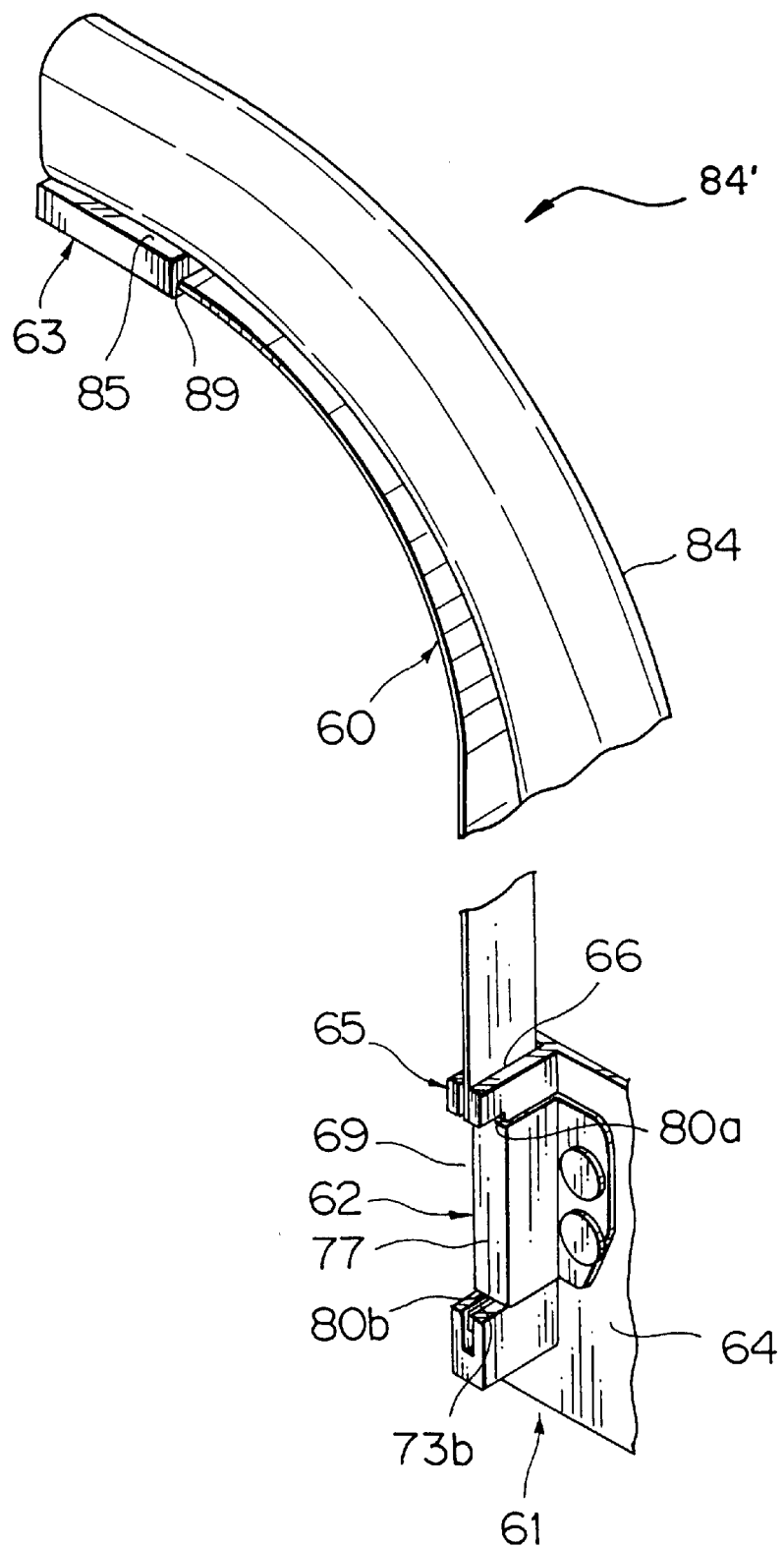
FIG. 20 is a perspective view showing the assembled state.

FIGS. 19 to 20 show a fifth embodiment of a power supply structure in a sliding structure according to this invention. The feature of the structure according to this embodiment resides in that an elastic member 60 which is a flat spring is secured at this stem to a protector 61 of synthetic resin by a securing jig 62 and is provided at its tip with a harness supporting member 63 of synthetic resin.

In FIG. 19, the protector 61 is similar to that of FIG. 5. An inserting portion 65 for the elastic member 60 protrudes integrally from a vertical base plate 64 of the protector 61. The inserting portion 65 is extended upright at 90 degree from the base plate 64 toward a cover or vehicle body. The inserting portion 65 has a vertical slit-like inserting groove 66 at the center in the axial direction. The front and rear sheet-like walls 67 constituting the inserting groove 66 are communicated with each other at a bottom 68 and the base plate 64. Namely, the inserting groove 66 is blocked at two directions at the lower and one lateral side by the bottom 68 and base plate 64 and opened at the upper and the other lateral side.

At the other lateral side (cover side or vehicle body side), the front and rear walls are cut to form a square shape recess 69. The recess 69 is formed in a portrait format. The upper end 69*a* and lower end 69*b* are located oppositely in parallel and horizontally. The upper end 69*a* constitutes an upper step which constitutes a part of an upper protrusion 70 and a lower step which constitutes a part of a lower protrusion 71. The depth of the recess 69 is more shallow than half of the width of the walls 67. On both sides of the inserting portion 66, a pair of short cylindrical protrusions (securing means) 72 are protruded integrally from the base plate 64. The protrusion 72 is made of synthetic resin. Incidentally, the "front" and "rear" are defined with respect to the vehicle.

The elastic member 60 has on the one side of its stem (side facing the cover and vehicle body) a square recess having the same shape and size as those of the recess of the inserting portion 65. The upper end 73a and the lower end of the recess 73 are opposed horizontally and in parallel. The side end 73c extends long vertically. The upper end 73a constitutes the upper step and is successive to a vertical upright portion of the elastic member 60. The lower end 73b constitutes a part of a lower protrusion 75. The depth of the recess 73 is more shallow than half of the lateral width of the elastic member 60. The lateral width of the elastic member 60 is equal to the depth of the inserting groove 66. The width of the inserting groove 66 is wider than the thickness of the elastic member 60.

The securing jig 62 is formed by punching and bending a metallic plate. Specifically, a protruding portion (securing portion) 77 is vertically swelled at the center of a base plate 76. On both sides of the protrusion 77, on the base plate 76, a pair of holes (securing means) each of which are slightly larger than the protrusion 72.

The protruding portion 77 is formed in a shape in section which is composed of a front and a rear wall 79 which are opposite vertically and in parallel and a central vertical wall which communicates the walls 79 so that a groove 81 in a square shape in section is formed inside. The upper end and lower end of the central wall 80 are located in parallel horizontally and are successive to the upper and the lower end of the front and rear walls 79. The groove 81 are opened in three directions, i.e. upward, downward and at the side of the base plate 64 of the protector 61.

The vertical length of the protruding portion 77 is slightly shorter than the length of the recess 73 of the elastic member 60 and than the length of the recess 69 of the inserting portion 65. The depth of the groove 81 is equal to or slightly deeper than the lateral width of a narrow width portion 82 adjacent to the recess 73 of the elastic member 60 and that of a narrow width portion 83 of the inserting portion 65.

As seen from FIG. 20, the elastic member 60 is inserted in the inserting groove 66 of the inserting portion 65 from side and above so that the protruding portion 77 of the securing jig 62 is fit into the respective recesses 69 and 73 (FIG. 19). With the protrusions 72 inserted in the holes 78 (FIG. 19), the protrusions 72 are crushed by e.g. thermal pressing so that the securing jig 62 is secured to the protector 61. Specifically, the upper end 80a of the protruding portion 77 is brought into contact with the upper end 73a of the recess 73 of the elastic member of the elastic member 60 (FIG. 19) whereas the lower end 80b of the protruding portion 77 is brought into contact with the lower end 73b of the recess 73. Thus, the elastic member 60 is firmly secured to the inserting portion 65 and not be removed therefrom.

With a wire harness (hereinafter denoted by 84') including a corrugated tube 84 (having an ellipsoidal sectional shape in section in this embodiment) secured to the elastic member 60 by e.g. tape winding or band, when the slide door is opened or closed violently, the wire harness 84 is pulled strongly so that force in a removal direction is acted on the elastic member 60. In such a case, the lower protrusion 75 on the stem side of the elastic member 60, i.e. lower step 73b is brought into contact with the lower end 80b of the protruding portion 77 of the securing jig 62 so that removal of the elastic member 60 can be surely prevented.

The inner face of the protruding portion 77 is brought into contact with the side end 73c of the elastic member 60 (FIG. 19) so that the position of the elastic member 60 is defined accurately. Thus, the deviation of the elastic member 60 from the wire harness 84' in the width direction and backlash of the elastic member 60 in the width direction can be prevented. This prevents alien sound or abrasion during vehicle driving from being generated. Since the elastic member 60 is firmly secured to the protector 61, a troublesome operation of the stem of the elastic member 60 to the wire harness 84 by e.g. tape winding is not required, thereby reducing the number of man-hours of assembling.

In place of the protrusion 72 of resin, a bolt (not shown) may be inserted into the hole 78 of the securing jig 62 and tightened by a nut (not shown). Otherwise, in place of the protrusion 72, a hole (not shown) may be formed. In this case, a bolt (not shown) passed through the hole 78 of the securing jig 62 is inserted into the hole on the side of the protector and tightened by a nut. Further, the securing jig 62 of resin may be provided with protrusions (not shown). In this case, the protrusion is passed through the hole (not shown) on the side of the protector and crushed and fixed on the rear side of the base plate 64 by e.g. thermal pressing.

The advantages described above can be obtained regardless with the presence/absence of the harness supporting member 63 on the tip side of the elastic member 60.

The harness supporting member 63 attached to the tip of the elastic member 60 is made of synthetic resin in a square shape. The harness supporting member 63 is composed of a flat upper face 85 for supporting the wire harness 84, both side faces 86 and front/rear face 87 which are orthogonal to the flat upper face 85 and a bottom face which is orthogonal to both side faces. The upper face 85 extends in a longitudinal direction of the wire harness 84 and elastic member 60. The width of the upper face 85 is slightly wider than that of the elastic member 60. The width of each of the front/rear face 87 and both side faces 86 is fairly wider than the thickness of the elastic member 60 in the height direction. A step t formed by the upper face 85 of the supporting member 63 and the elastic is desired to be small in view of contact between the wire harness 84 and the elastic member 60.

In the longitudinal direction, the harness supporting member 63 has a slit-like insertion hole 88 into which the tip of e.g. the elastic member 60 is to be inserted. An engagement protrusion (not shown) is formed within the insertion hole 88, and an engagement hole is formed in the elastic member 60. The engagement protrusion and the engagement hole are engaged with each other so that the harness supporting member is fixed. Inversely, the elastic member 60 may have the engagement protrusion and the harness supporting member 63 may have the engagement hole.

The tip of the elastic member 60 may be secured to the harness securing member 63 by insert molding. The tip of the elastic member 60 maybe folded back so that it can be substituted for the harness supporting member 63.

As shown in FIG. 20, the wire harness 84' which has a circular or elliptical shape in section is placed fixedly on the upper face 85 of the harness supporting member 63. Both sides of the wire harness 84' are supported in substantial slidable contact with the base plate 64 of the protector 61 and cover (not shown). This makes it unnecessary to secure the wire harness 84' and the elastic member 60 (inclusive of the harness supporting member 63) by tape winding. It is needless to say that the wire harness 84' is extended in the longitudinal direction. Thus, as the slide door is opened or closed, the wire harness expands or contracts while it slides smoothly along the upper face of the harness supporting member.

Since the harness supporting member 63 which is thicker than the elastic member 60 is attached to the tip of the elastic member 60, contact between the wire harness 84' and the edge of the elastic member 60 does not exist. This prevents abrasion and damaging of the wire harness 84' and occurrence of alien sound. Particularly, where the corrugated tube 84 alternately having concave grooves and convex strips is used, interference between the tip of the elastic member 60 and the unevenness of the corrugated tube 84 and sharp bending of the wire harness 84' due to it can be prevented. This permits the wire harness 84' to expand or contract smoothly and its looseness to be absorbed. Further, this prevents the damage or deformation of the wire harness or occurrence of alien sound. Where the wire harness 84' is secured to the elastic member 60 by tape winding or band tightening, the step 89 of the harness supporting member 63 on the side of the stem serves as a stopper so that deviation or displacement of the tape or band can be prevented.

Embodiment 6

Figure 23:
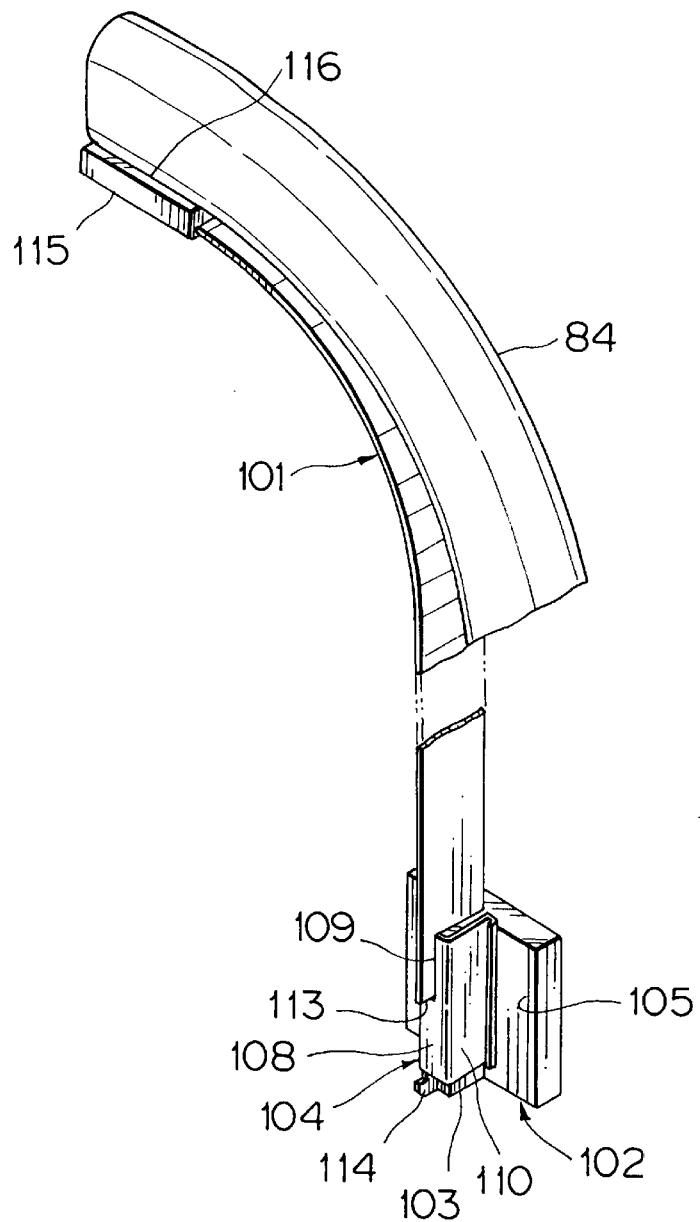
FIG. 23 is a perspective view showing the assembled state in the sixth embodiment.
Figure 21:
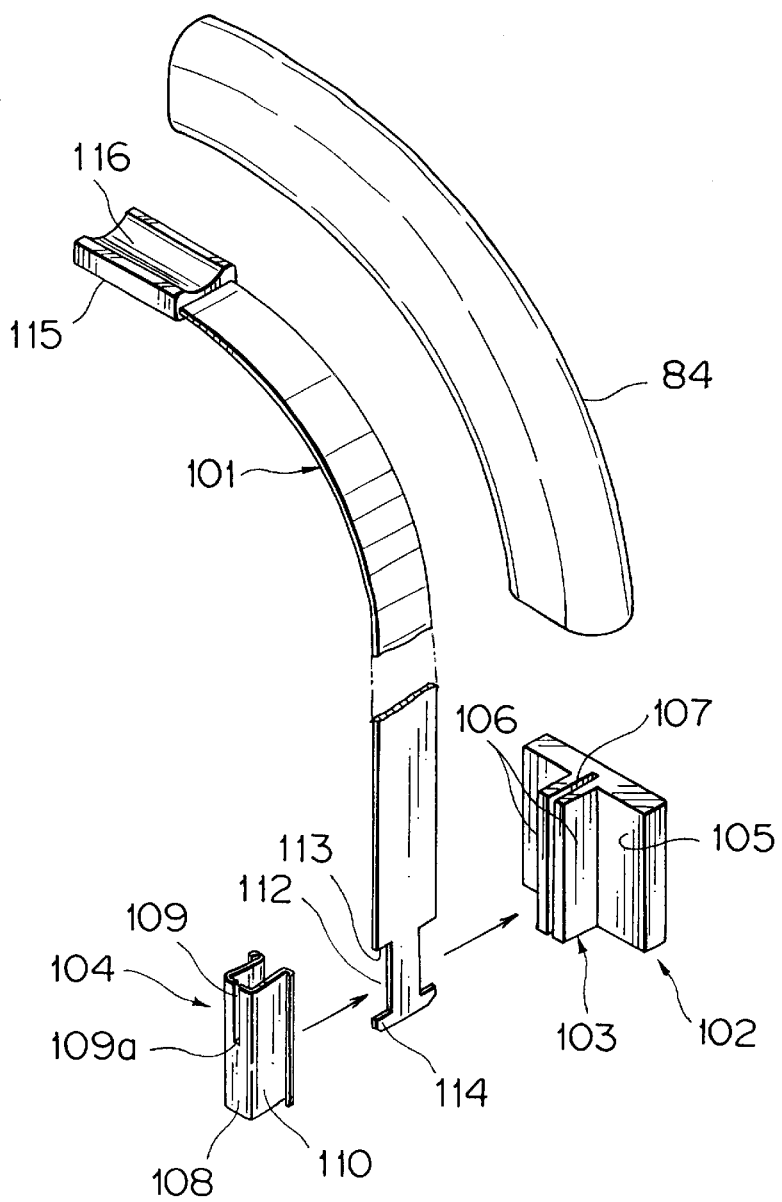
FIG. 21 is an exploded perspective view of a sixth embodiment of the power supply structure in a sliding structure according to this invention.
Figure 22:
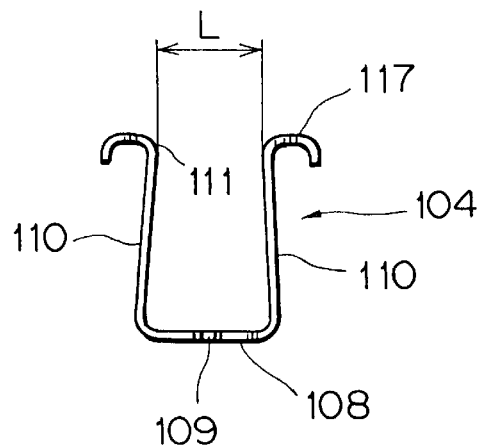
FIG. 22 is a plan view of a securing jig in the sixth embodiment.

FIGS. 21 to 23 show a sixth embodiment of a power supply structure of a slide door according to this invention.

The structure according to this embodiment intends to improve the structure of securing the elastic member according to the fifth embodiment, i.e. an inserting portion 103 and a securing jig 104 on the side of the protector 102 which are used to secure the stem of the elastic member 101, thereby saving the space for the protector and facilitating the operation of securing.

As seen from FIG. 21, a pair of front and rear vertical walls in vicinity to each other are protruded from the base plate 105 of the protector 102. A slit-like insertion groove 107 is formed in between both walls 106 so that it extends vertically through both walls. The inserting groove 107 is recessed deep to reach the intermediate position of the base plate 105 in the direction of the plate thickness.

As seen from FIG. 22, the securing jig 104 is made of an elastic metallic plate which is bent in a ⊐-shape in cross section. The securing jig 14 has a central wall 108 with a slit 109 extended from the upper end to the intermediate position in the height direction, and both side walls 110 which slant inwardly in a free state so that the inner width L between at least the tips of both walls 110 is smaller than the lateral width of the inserting portion 103 on the side of the protector, i.e. the outer width of the pair of walls 106 to have elastic force in the lateral direction. Thus, the securing jig 104 has spring force capable of nipping the inserting portion 103 of the protector 102. The tip sides of both side walls are outwardly folded back in a square shape so that the securing jig 104 can be inserted into the inserting portion 103 with the aid of the inner curved faces 111.

The elastic member 101 has recesses 112 on both sides at the stem. The elastic member 101 can be inverted. The length of the recess in the vertical direction is slightly longer than the distance from the lower end of the center wall 108 of the securing jig 104 to the bottom 109a of the slit 109. On the upper side of the recess 112, a step 113 for contact is formed, whereas on the lower side thereof, a protrusion 114 is formed. The recess 112 may be made on only the one side.

A harness supporting member 115 attached to the tip of the elastic member 101 has a curved concave groove 116 on which the wire harness 84 (illustrated as an outer corrugated tube having an elliptical shape) is placed stably.

The stem of the elastic member 101 is inserted in the inserting portion 103 of the protector 102 from side as indicated by arrow. Next, the securing jig 104 is inserted into the outside of the inserting portion 103 as indicted by the arrow. By such a simple operation, as seen from FIG. 23, the stem of the elastic member 101 is secured to the protector 102.

The one side of the elastic member 101 enters the slit 109 of the slit 109. The step 113 on the upper step 113 of the recess 112 (FIG. 21) of the elastic member 101 is brought into contact with the bottom 109a of the slit 109, whereas the lower protrusion 114 is brought into contact with the lower end of the wall 108. In this state, the walls 110 on both sides of the securing jig 104 inwardly strongly nips the inserting portion 103 of the protector 110. The rear face of the wall 108 is brought into contact with the front face of the inserting portion 103. In addition, or otherwise, the tip face 117 (FIG. 22) of the securing jig 104 is brought into contact with the base plate 105. Thus, the elastic member 101 is firmly fixed in both longitudinal and width directions. The wire harness 84 is stably supported on the curved face of the concave groove 116 of the harness supporting member 115.

In accordance with this embodiment, unlike the embodiment of FIG. 19, the protrusions 72 for securing and the base plate portion having the holes 78 corresponding to the protrusions 72 are not required so that the structure can be downsized and space-saved. Further, since the securing jig is secured by one-touch, the operability can be enhanced. Additionally, the respective walls 106 of the inserting portion 103 on the side of the protector are made flexible so that the walls 106 nips the elastic member 101 in the direction of the plate thickness with the aid of the nipping force of the securing jig 104.

The structure of securing the elastic member using the securing jig 62, 104 and the inserting potion 65, 103 according to the fifth and sixth embodiments can be applied to not only the elastic member 60, 101 in FIGS. 19, 21, but also to the elastic member 23 in FIG. 5 and the elastic member 41 in FIG. 11. Further, the harness supporting member 63, 115 can be also applied to the elastic member 23 in FIG. 5 and elastic member 52 in FIG. 15.

Embodiment 7

Figure 24:
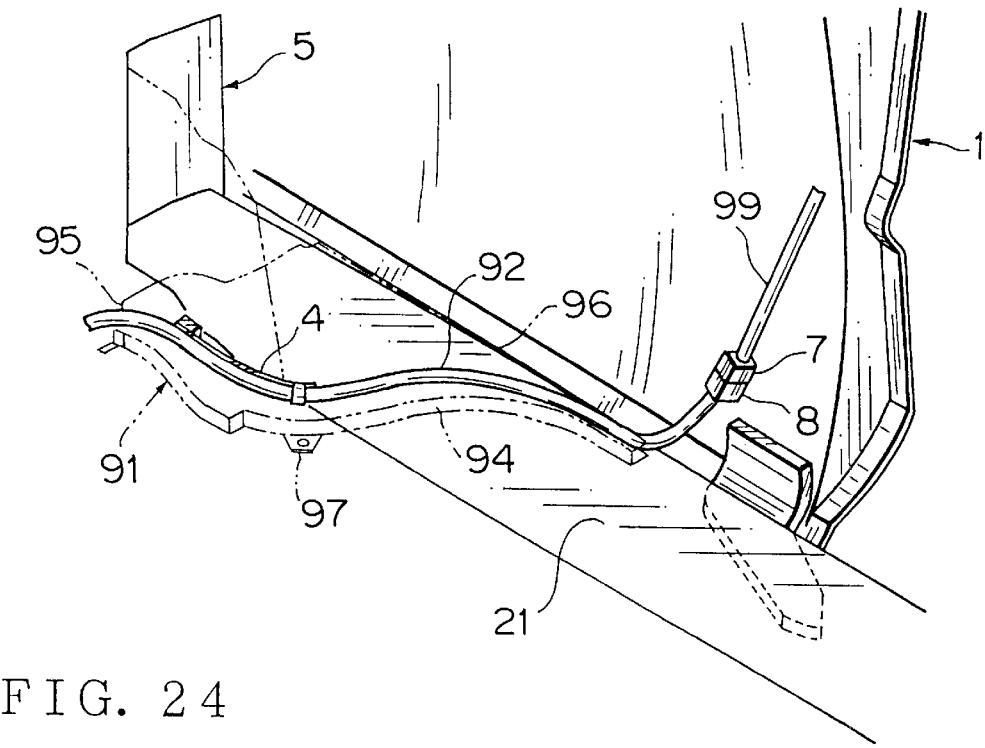
FIG. 24 is a perspective view of a seventh embodiment of the power supply structure in a sliding structure according to this invention (when a slide door has been fully opened)

FIGS. 24 to 25 show a sixth embodiment of a power supply structure of a slide door according to this invention.

The structure according to this embodiment resides in that in place of the embodiment shown in FIG. 1, a protector 91 of synthetic resin is arranged not on the side of the slide door 1 but on the side of the vehicle body 5. In this structure, looseness of the wire harness arranged from the slide door (sliding structure) 1 into the vehicle body (body) 5 is absorbed by an elastic member 4 within the protector 91 on the side of the vehicle body 5.

In this embodiment, the protector 91 is arranged horizontally beneath the step portion 21 of the vehicle body 5. The rear end of the protector 91 extends to the side of the slide door 1 and the front end 94 thereof is gradually width-reduced to form a lateral concave shape in cross-section. The protector 91 has a first harness outlet 95 on its rear inner side and a second harness outlet 96 which is opened wide linearly toward the side of the slide door 1. The protector 91 is secured to the vehicle body 5 by the bracket 97.

The elastic member 4 is extended from the rear end (first harness inlet 95) of the protector 111 to the middle portion thereof in the longitudinal direction. The wire harness 92 is arranged along the elastic member 4. The stem of the elastic member 4 is secured to the protector 91 by a securing piece 118. The elastic member 4 should not be limited to a flat spring, but may be an elastic means (not shown) in various forms, i.e. the elastic members 23 (FIG. 5), 41 (FIG. 11) and 52 (FIG. 15). The harness supporting members 63 and 115

(FIGS. 19 and 21) may be also used. The material, shape and location of the protector 91 may be changed as necessary.

In the fully closed state of the slide door 1 shown in FIG. 24, the wire harness 92 is pulled forward along the curved portion 94 of the protector 91 (represented by 94), and the elastic member 4 urges the wire harness 92 toward the passenger section of the vehicle body 5. The wire harness 92 on the side of the vehicle body 5 which has been derived from the protector 91 is connected to the wire harness 99 on the side of the slide door though connectors 7, 8. The door side wire harness 99 is connected to functional components (not shown) within the slide door 1.

In the fully opened state of the slide door 1 shown in FIG. 25, the wire harness 92 is pulled backward together with the slide door 1 so that it is greatly curved backward to loosen. However, it is also urged toward the passenger section of the vehicle body owing to the restoring force of the elastic member which has been curved together with the wire harness. Thus, the looseness of the wire harness 92 is absorbed so that the wire harness 92 can be prevented from being caught between the slide door 1 and the vehicle body 5.

What is claimed is:

1. A power supply structure in a sliding structure comprising:
   a wire harness, a first end of which is secured to one of a sliding structure and a body and a second end of which is connected to the other of said sliding structure and said body, said wire harness being arranged between the sliding structure and said body; and
   an elastic member arranged along said wire harness in a longitudinal direction of said wire harness from said first end of said wire harness so that the wire harness is supported by said elastic member, wherein
   said elastic member is secured to said wire harness, and a stem of said elastic member is located at a fixed side of the wire harness whereas a tip of said elastic member is located at and attached to an apex of a curved segment of said wire harness.

2. A power supply structure in a sliding structure according to claim 1, wherein said elastic member is arranged along a curved inner face of said wire harness.

3. A power supply structure in a sliding structure according to claim 1, wherein said elastic member is bent at an intermediate position in a longitudinal direction to form a bending segment and arranged in a curved outer face of said wire harness, a tip of said elastic member is secured to said wire harness, and said bending segment is separated from said wire harness.

4. A power supply structure in a sliding structure according to claim 1, wherein said elastic member is composed of a flat spring segment in contact with a curved inner face of said wire harness and a spiral segment, the center of which is fixed.

5. A power supply structure in a sliding structure according to claim 1, wherein said elastic member is arranged partially along said wire harness in a longitudinal direction of said wire harness.

6. A power supply structure in a sliding structure according to claim 1, wherein said elastic member is constructed of a lengthy flat spring.

7. A power supply structure in a sliding structure according to claim 1, wherein said elastic member is provided with a harness supporting member at its tip.

8. A power supply structure in a sliding structure according to claim 7, wherein said harness supporting member is thicker at its tip than said elastic member.

9. A power supply structure in a sliding structure according to claim 1, wherein a curved portion of said wire harness and said elastic member are housed in a protector.

10. A power supply structure in a sliding structure according to claim 9, wherein said elastic member is secured to said protector at its stem.

11. A power supply structure in a sliding structure according to claim 10, wherein said stem has a first recess, said protector has an inserting portion corresponding to said stem, and said elastic member is secured to said inserting portion by a securing jig engaged with said recess.

12. A power supply structure in a sliding structure according to claim 11, wherein said securing jig is secured to said protector by securing means.

13. A power supply structure in a sliding structure according to claim 11, wherein said inserting portion has a second recess having a shape similar to that of the first recess.

14. A power supply structure in a sliding structure according to claim 11, wherein said securing jig has elastic force enough to nip said inserting portion.

15. A power supply structure in a sliding structure comprising:
    a wire harness, a first end of which is secured to one of a sliding structure and a body and a second end of which is connected to the other of said sliding structure and said body, said wire harness being arranged between the sliding structure and said body; and
    an elastic member arranged along said wire harness in a longitudinal direction of said wire harness from said first end of said wire harness so that the wire harness is supported by said elastic member; wherein
    said elastic member includes a first spring segment along a curved outer face of said wire harness and a second spring segment along a curved inner face of said wire harness, said second spring segment protrudes toward a free end of said elastic member and said second spring segment has a spring constant larger than that of said first spring segment.

16. A power supply structure in a sliding structure according to claim 15, wherein said elastic member is constructed of a lengthy flat spring.

17. A power supply structure in a sliding structure according to claim 15, wherein said first spring segment and said second spring segment are coupled by a coupling segment.

18. A power supply structure in a sliding structure according to claim 17, wherein a tip segment and a stem segment of said second spring segment protrude from said coupling segment in opposite directions, and said stem segment of said second spring segment is opposed to said first spring segment.

19. A power supply structure in a sliding structure according to claim 17, wherein said first spring segment, said second spring segment and said coupling segment are formed in a sheet form, and said second spring segment is shorter and narrower than said first spring segment.

20. A power supply structure in a sliding structure according to claim 19, wherein said wire harness is fixedly sandwiched between said first spring segment and said second spring segment at said coupling segment.

21. A power supply structure in a sliding structure comprising:
    a wire harness, a first end of which is secured to one of a sliding structure and a body and a second end of which is connected to the other of said sliding structure and said body, said wire harness being arranged between the sliding structure and said body;
    an elastic member arranged along said wire harness in a longitudinal direction of said wire harness from said first end of said wire harness so that wire harness is supported by said elastic member;

wherein said elastic member includes a first spring segment along a curved outer face of said wire harness and a second spring segment along a curved inner face of said wire harness, said second spring segment protrudes toward a free end of said elastic member and said second spring segment has a spring constant larger than that of said first spring segment;

wherein said first spring segment and said second spring segment are coupled by a coupling segment; and wherein said first spring segment, said second spring segment and said coupling segment are formed in a sheet form, and said second spring segment is shorter and narrower than said first spring segment.

22. A power supply structure in a sliding structure comprising:

a wire harness, a first end of which is secured to one of a sliding structure and a body and a second end of which is connected to the other of said sliding structure and said body, said wire harness being arranged between the sliding structure and said body;

an elastic member arranged along said wire harness in a longitudinal direction of said wire harness from said first end of said wire harness so that wire harness is supported by said elastic member;

wherein a curved portion of said wire harness and said elastic member are housed in a protector;

wherein said elastic member is secured to said protector at its stem; and wherein said stem has a first recess, said protector has an inserting portion corresponding to said stem, and said elastic member is secured to said inserting portion by a securing jig engaged with said recess.

23. A power supply structure in a sliding structure comprising:

a wire harness a first end of which is secured to one of a sliding structure and a body and a second end of which is connected to the other of said sliding structure and said body, said wire harness being arranged between the sliding structure and said body;

an elastic member arranged along said wire harness in a longitudinal direction of said wire harness from said first end of said wire harness so that the wire harness is supported by said elastic member;

wherein a curved portion of said wire harness and said elastic member are housed in a protector;

wherein said elastic member is secured to said protector at its stem; and wherein said stem has a first recess, said protector has an inserting portion corresponding to said stem, and said elastic member is secured to said inserting portion by a securing jig engaged with said recess.

* * * * *

UNITED STATES PATENT AND TRADEMARK OFFICE
CERTIFICATE OF CORRECTION

PATENT NO.     : 6,603,076 B2
DATED          : August 5, 2003
INVENTOR(S)    : Kenichi Doshita et al.

It is certified that error appears in the above-identified patent and that said Letters Patent is hereby corrected as shown below:

<u>Column 3,</u>
Line 15, change "larger" to -- smaller --.

<u>Column 24,</u>
Line 37, change "larger" to -- smaller --.

Signed and Sealed this

Thirteenth Day of April, 2004

JON W. DUDAS
*Acting Director of the United States Patent and Trademark Office*